United States Patent [19]
Peleg et al.

[11] Patent Number: 6,035,316
[45] Date of Patent: *Mar. 7, 2000

[54] APPARATUS FOR PERFORMING MULTIPLY-ADD OPERATIONS ON PACKED DATA

[75] Inventors: Alexander D. Peleg, Haifa, Israel; Millind Mittal, South San Francisco; Larry M. Mennemeier, Boulder Creek, both of Calif.; Benny Eitan, Haifa, Israel; Carole Dulong, Saratoga, Calif.; Eiichi Kowashi, Ryugasaki, Japan; Wolf Witt, Walnut Creek, Calif.; Derrick Chu Lin, Foster City, Calif.; Ahmet Bindal, Sunnyvale, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/606,212

[22] Filed: Feb. 23, 1996

Related U.S. Application Data

[63] Continuation-in-part of application No. 08/522,067, Aug. 31, 1995.

[51] Int. Cl.[7] .............................. G06F 7/38; G06F 7/00; G06F 15/00
[52] U.S. Cl. .......................... 708/523; 708/603; 708/626; 395/562; 395/800.42
[58] Field of Search ............................. 364/736, 736.01, 364/736.02, 750.5, 754, 758, 760, 715.09; 395/650, 675, 750, 800, 562, 800.42

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,344,151 | 8/1982 | White | 364/754 |

(List continued on next page.)

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Inc. (1991).

*Errata to MC88110 Second Generation RISC Microprocessor User's Manual*, Motorola Inc. (1992), pp. 1–11.

*MC88110 Programmer's Reference Guide*, Motorola Inc. (1992), p 1–4.

*i860™ Microprocessor Family Programmer's Reference Manual*, Intel Corporation (1992), Ch. 1, 3, 8, 12.

R. B. Lee, *Accelerating Multimedia With Enhanced Microprocessors*, IEEE Micro (Apr. 1995), pp 22–32.

*TMS320C2x User's Guide*, Texas Instruments (1993) pp 3–2 through 3–11; 3–28 through 3–34; 4–1 through 4–22; 4–41; 4–103; 4–119 through 4–120; 4–122; 4–150 through 4–151.

(List continued on next page.)

*Primary Examiner*—Emmanuel L. Moise
*Attorney, Agent, or Firm*—Blakely, Sokoloff, Taylor & Zafman LLP

[57] ABSTRACT

A processor having a first and second storage having a first and second packed data, respectively. Each packed data includes a first, second, third, and fourth data element. A multiply-add circuit is coupled to the first and second storage areas. The multiply-add circuit includes a first, second, third, and fourth multiplier, wherein each of the multipliers receives a corresponding set of said data elements. The multiply-add circuit further includes a first adder coupled to the first and second multipliers, and second adder coupled to the third and fourth multipliers. A third storage area is coupled to the adders. The third storage area includes a first and second field for saving output of the first and second adders, respectively, as first and second data elements of a third packed data.

16 Claims, 29 Drawing Sheets

U.S. PATENT DOCUMENTS

| | | | |
|---|---|---|---|
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,989,168 | 1/1991 | Kuroda et al. | 364/715.09 |
| 5,095,457 | 3/1992 | Jeong | 364/758 |
| 5,111,422 | 5/1992 | Ulrich | 364/750.5 |
| 5,187,679 | 2/1993 | Vassiliadis et al. | 364/786 |
| 5,262,976 | 11/1993 | Young et al. | 364/760 |
| 5,321,644 | 6/1994 | Schibinger | 364/737 |
| 5,325,320 | 6/1994 | Chiu | 364/760 |
| 5,442,799 | 8/1995 | Murakami et al. | 395/800 |
| 5,457,805 | 10/1995 | Nakamura | 395/800 |

OTHER PUBLICATIONS

L. Gwennap, *New PA–RISC Processor Decodes MPEG Video*, Microprocessor Report (Jan. 1994), pp 16, 17.

SPARC Technology Business, *UltraSPARC Multimedia Capabilities On–Chip Support for Real–Time Video and Advanced Graphics*, Sun Microsystems (Sep. 1994).

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSFs with VLIW*, Microprocessor Report (Dec. 1994), pp 12–18.

N. Margulis, *i860 Microprocessor Architecture*, McGraw Hill, Inc. (1990) Ch. 6, 7, 8, 10, 11.

*Pentium Processor User's Manual, Volume 3: Architecture and Programming Manual*, Intel Corportation (1993), Ch. 1, 3, 4, 6, 8, and 18.

| 63 | 5655 | 4847 | 4039 | 3231 | 2423 | 1615 | 87 | 0 |
|---|---|---|---|---|---|---|---|---|
| bbbb bbbb | bbbb bbbb | bbbb bbbb | bbbb bbbb | bbbb bbbb | bbbb bbbb | bbbb bbbb | bbbb bbbb | |

Unsigned Packed Byte In-register Representation 510

| 63 | 5655 | 4847 | 4039 | 3231 | 2423 | 1615 | 87 | 0 |
|---|---|---|---|---|---|---|---|---|
| sbbb bbbb | sbbb bbbb | sbbb bbbb | sbbb bbbb | sbbb bbbb | sbbb bbbb | sbbb bbbb | sbbb bbbb | |

Signed Packed Byte In-register Representation 511

Fig. 5a

| 63 | 4847 | 3231 | 1615 | 0 |
|---|---|---|---|---|
| wwww wwww | wwww wwww | wwww wwww | wwww wwww |

Unsigned Packed Word In-register Representation 312

| 63 | 4847 | 3231 | 1615 | 0 |
|---|---|---|---|---|
| swww wwww | swww wwww | swww wwww | swww wwww |

Signed Packed Word In-register Representation 513

Fig. 5b

| 63 | 3231 | 0 |
|---|---|---|
| dddd dddd dddd dddd dddd dddd dddd dddd | dddd dddd dddd dddd dddd dddd dddd dddd |

Unsigned Packed Doubleword In-register Representation 314

| 63 | 3231 | 0 |
|---|---|---|
| sddd dddd dddd dddd dddd dddd dddd dddd | sddd dddd dddd dddd dddd dddd dddd dddd |

Signed Packed Doubleword In-register Representation 515

APPARATUS FOR PERFORMING MULTIPLY-ADD OPERATIONS ON PACKED DATA

CROSS-REFERENCE TO RELATED APPLICATION

This Patent Application is a Continuation-in-Part of application Ser. No. 08/522,067 still pending titled "A Method and Operation for Performing Multiply-Add Operations on Packed Data," filed Aug. 31, 1995 by Alexander D. Peleg, Millind Mittal, Larry M. Mennemeier, Benny Eitan, Andrew F. Glew, Carole Dulong, Eiichi Kowashi, and Wolf Witt.

BACKGROUND OF THE INVENTION

1. Field of the Invention

In particular, the invention relates to the field of computer systems. More specifically, the invention relates to the area of packed data operations.

2. Description of Related Art

In typical computer systems, processors are implemented to operate on values represented by a large number of bits (e.g., 64) using instructions that produce one result. For example, the execution of an add instruction will add together a first 64-bit value and a second 64-bit value and store the result as a third 64-bit value. However, multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data which may be represented in a small number of bits. For example, graphical data typically requires 8 or 16 bits and sound data typically requires 8 or 16 bits. Each of these multimedia application requires one or more algorithms, each requiring a number of operations. For example, an algorithm may require an add, compare and shift operation.

To improve efficiency of multimedia applications (as well as other applications that have the same characteristics), processors may provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these processors provide instructions for separately manipulating, in response to a single instruction, each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions. In this manner, these processors can more efficiently process multimedia applications.

However, if the loop of operations contains an operation that cannot be performed by the processor on packed data (i.e., the processor lacks the appropriate instruction), the data will have to be unpacked to perform the operation. For example, if the multimedia algorithm requires an add operation and the previously described packed add instruction is not available, the programmer must unpack both the first packed data and the second packed data (i.e., separate the elements comprising both the first packed data and the second packed data), add the separated elements together individually, and then pack the results into a packed result for further packed processing. The processing time required to perform such packing and unpacking often negates the performance advantage for which packed data formats are provided. Therefore, it is desirable to incorporate in a computer system a set of packed data instructions that provide all the required operations for typical multimedia algorithms. However, due to the limited die area on today's general purpose microprocessors, the number of instructions which may be added is limited. Therefore, it is desirable to invent instructions that provide both versatility (i.e. instructions which may be used in a wide variety of multimedia algorithms) and the greatest performance advantage.

One technique for providing operations for use in multimedia algorithms is to couple a separate digital signaling processor (DSP) to an existing general purpose processor (e.g., The Intel® 486 manufactured by Intel Corporation of Santa Clara, Calif.). The general purpose processor allocates jobs that can be performed using packed data (e.g., video processing) to the DSP.

One such DSP includes a multiply accumulate instruction that adds to an accumulation value the results of multiplying together two values. (see Kawakami, Yuichi, et al., "A Single-Chip Digital Signal Processor for Voiceband Applications", IEEE International Solid-State Circuits Conference, 1980, pp. 40–41). An example of the multiply accumulate operation for this DSP is shown below in Table 1, where the instruction is performed on the data values $A_1$ and $B_1$ accessed as Source1 and Source2, respectively.

TABLE 1

| Multiply-Accumulate Source1, Source2 | |
|---|---|
| $A_1$ | Source1 |
| $B_1$ | Source2 |
| = | |
| $A_1B_1$+Accumulation Value | Result1 |

One limitation of this instruction is its limited efficiency—i.e., it only operates on 2 values and an accumulation value. For example, to multiply and accumulate two sets of 2 values requires the following 2 instructions performed serially: 1) multiply accumulate the first value from the first set, the first value from the second set, and an accumulation value of zero to generate an intermediate accumulation value; 2) multiply accumulate the second value from the first set, the second value from the second set, and the intermediate accumulation value to generate the result.

Another DSP includes a multiply accumulate instruction that operates on two sets of two values and an accumulation value (See "Digital Signal Processor with Parallel Multipliers", U.S. Pat. No. 4,771,379-referred to herein as the "Ando et al." reference). An example of the multiply accumulate instruction for this DSP is shown below in Table 2, where the instruction is performed on the data values $A_1$, $A_2$, $B_1$ and $B_2$ accessed as Source1–4, respectively.

TABLE 2

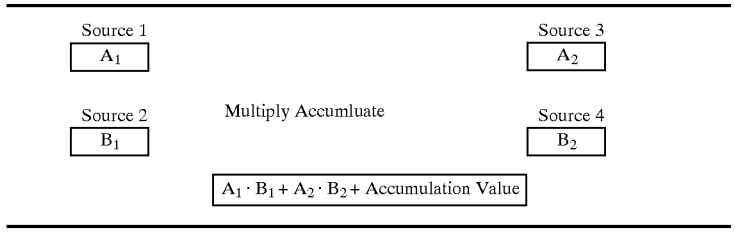

Using this technique, two sets of 2 values are multiplied and then added to an accumulation value in one instruction.

This multiply accumulate instruction has limited versatility because it always adds to the accumulation value. As a result, it is difficult to use the instruction for operations other than multiply accumulate. For example, the multiplication of complex numbers is commonly used in multimedia applications. The multiplication of two complex number (e.g., $r_1\ i_1$ and $r_2\ i_2$) is performed according to the following equation: Real Component = $r_1 \cdot r_2 - i_1 \cdot i_2$ Imaginary Component = $r_1 \cdot i_2 + r_2 + i_1$
This DSP cannot perform the function of multiplying together two complex numbers using one multiply accumulate instruction.

The limitations of this multiply accumulate instruction can be more clearly seen when the result of such a calculation is needed in a subsequent multiplication operation rather than an accumulation. For example, if the real component were calculated using the DSP, the accumulation value would need to be initialized to zero in order to correctly compute the result. Then the accumulation value would again need to be initialized to zero in order to calculate the imaginary component. To perform another complex multiplication on the resulting complex number and a third complex number (e.g., r3, i3), the resulting complex number must be resealed and stored into the acceptable memory format and the accumulation value must again be initialized to zero. Then, the complex multiplication can be performed as described above. In each of these operations the ALU, which is devoted to the accumulation value, is superfluous hardware and extra instructions are needed to reinitialize this accumulation value. These extra instructions would otherwise have been unnecessary.

A further limitation of this technique is that the data must be accessed through expensive multi-ported memory. This is because the multipliers are connected directly with data memories. Therefore the amount of parallelism which can be exploited is limited to a small number by the cost of the interconnection, and the fact that this interconnection is not decoupled from the instruction.

The Ando, et al. reference also describes that an alternative to this expensive interconnection is to introduce a delay for each subsequent pair of data to be multiplied. This solution diminishes any performance advantages to those provided by the solution previously shown in Table 1.

Furthermore, the notion of multi-ported memory or of pipelined accesses to memory entails the use of multiple addresses. This explicit use of one address per datum, clearly demonstrates that the critical notion of packed data is not employed in this technique.

SUMMARY OF THE INVENTION

A processor having a first and second storage having a first and second packed data, respectively. Each packed data includes a first, second, third, and fourth data element. A multiply-add circuit is coupled to the first and second storage areas. The multiply-add circuit includes a first, second, third, and fourth multiplier, wherein each of the multipliers receives a corresponding set of said data elements. The multiply-add circuit further includes a first adder coupled to the first and second multipliers, and second adder coupled to the third and fourth multipliers. A third storage area is coupled to the adders. The third storage area includes a first and second field for saving output of the first and second adders, respectively, as first and second data elements of a third packed data.

BRIEF DESCRIPTION OF THE DRAWINGS

FIG. 5a illustrates in-register packed data representations according to one embodiment of the invention.

FIG. 5b illustrates in-register packed data representations according to one embodiment of the invention.

FIG. 5c illustrates in-register packed data representations according to one embodiment of the invention.

FIGS. 9a–9e illustrate a Wallace Tree performing the partial product summation and reduction for one embodiment of the present invention.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

DEFINITIONS

To provide a foundation for understanding the description of the embodiments of the invention, the following definitions are provided.

Bit X through Bit Y:

defines a subfield of binary number. For example, bit six through bit zero of the byte $00111010_2$ (shown in base two) represent the subfield $111010_2$. The '2' following a binary number indicates base 2. Therefore, $1000_2$ equals $8_{10}$, while $F_{16}$ equals $15_{10}$.

Rx:

is a register. A register is any device capable of storing and providing data. Further functionality of a register is described below. A register is not necessarily, included on the same die or in the same package as the processor.

SRC1, SRC2, and DEST:

identify storage areas (e.g., memory addresses, registers, etc.)

Source1-i and Result1-i:

represent data.

OVERVIEW

This application describes an apparatus in a processor performing multiply-add operations on packed data. In one embodiment, two multiply-add operations are performed using a single multiply-add instruction as shown below in Table 3a and Table 3—Table 3a shows a simplified representation of the disclosed multiply-add operation, while Table 3b shows a bit level example of the disclosed multiply-add operation.

TABLE 3a

| Multiply-Add Source1, Source2 | | | | |
|---|---|---|---|---|
| $A_1$ | $A_2$ | $A_3$ | $A_4$ | Source1 |
| $B_1$ | $B_2$ | $B_3$ | $B_4$ | Source2 |
| = | | | | |
| $A_1B_1+A_2B_2$ | | $A_3B_3+A_4B_4$ | | Result1 |

Thus, the described embodiment of the multiply-add operation multiplies together corresponding 16-bit data elements of Source1 and Source2 generating four 32-bit intermediate results. These 32-bit intermediate results are summed by pairs producing two 32-bit results that are packed into their respective elements of a packed result. As further described later, alternative embodiment may vary the number of bits in the data elements, intermediate results, and results. In addition, alternative embodiment may vary the number of data elements used, the number of intermediate results generated, and the number of data elements in the resulting packed data.

COMPUTER SYSTEM

Figure 1:
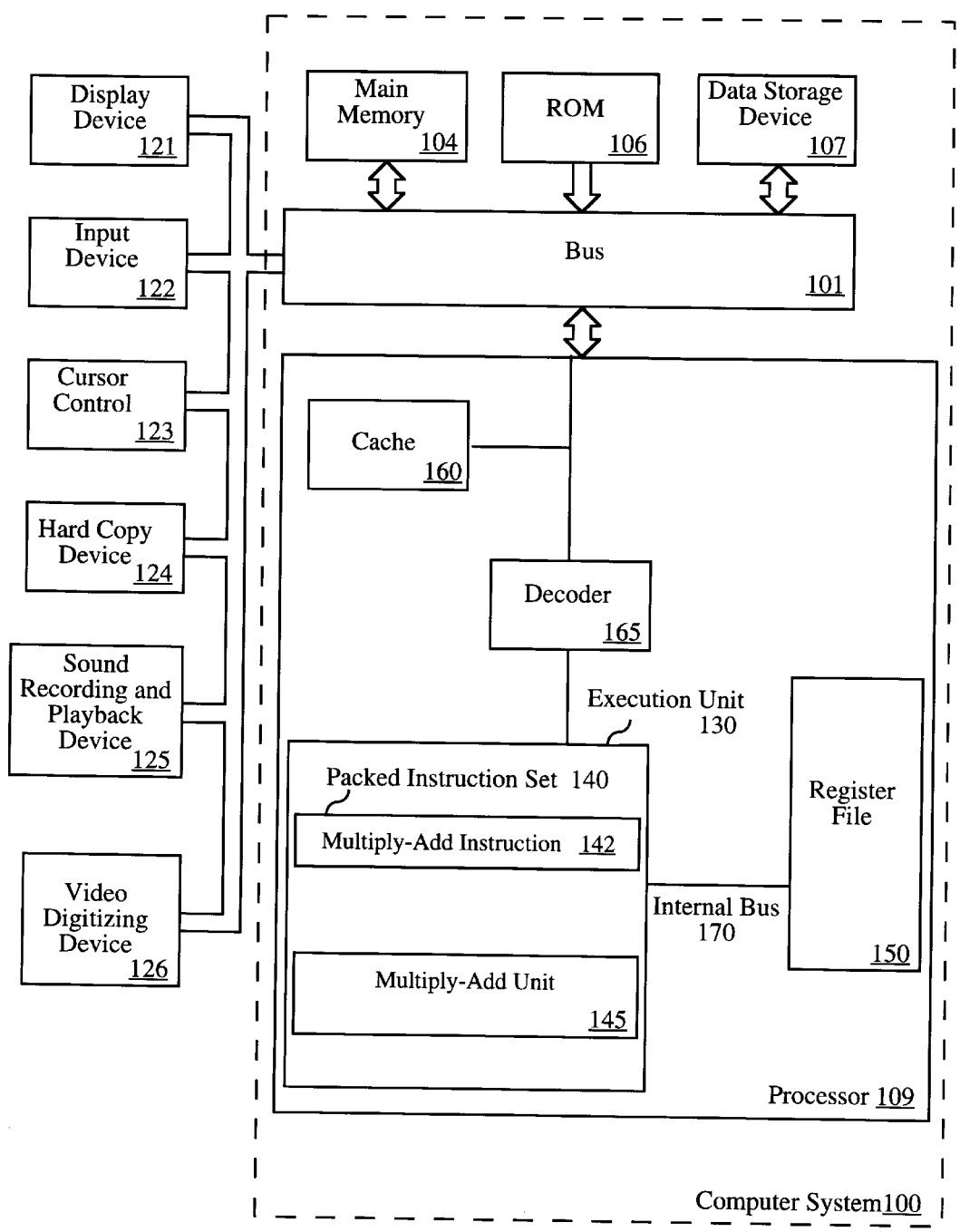
FIG. 1 illustrates an computer system having one embodiment of the invention.

FIG. 1 illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1 also illustrates that processor 109 includes an execution unit 130, a multiply-add unit 145, a register file 150, a cache 160, a decoder 165, and an internal bus 170. Of course, processor 109 contains additional circuitry which is not necessary to understanding the invention.

Execution unit 130 is used for executing instructions received by processor 109. In addition to recognizing instructions typically implemented in general purpose processors, execution unit 130 recognizes instructions 142

TABLE 3b

| 11111111 11111111 | 11111111 00000000 | 01110001 11000111 | 01110001 11000111 |
|---|---|---|---|
| 3 Multiply | 2 Multiply | 1 Multiply | 0 Multiply |
| 00000000 00000000 | 00000000 00000001 | 10000000 00000000 | 00000100 00000000 |
| ↓ | ↓ | ↓ | ↓ |
| 32-Bit Intermediate Result 4 | 32-Bit Intermediate Result 3 | 32-Bit Intermediate Result 2 | 32-Bit Intermediate Result 1 |
| Add | | Add | |
| 11111111 11111111   11111111 00000000 | | 11001000 11100011   10011100 00000000 | |
| 1 | | 0 | | in packed instruction set 140 for performing operations on packed data formats. Packed instruction set 140 includes instructions for supporting multiply-add operations. In addition, packed instruction set 140 may also include instructions for supporting a pack operation, an unpack operation, a packed add operation, a packed subtract operation, a packed multiply operation, a packed shift operation, a packed compare operation, a population count operation, and a set of packed logical operations (including packed AND, packed ANDNOT, packed OR, and packed XOR) as described in "A Microprocessor providing a set of operations for packed data", filed on Aug. 31, 1995 Ser. No. 08/521,360, now abandoned. Execution unit 130 further includes the multiply-add unit 145 for performing multiply-add operations.

Execution unit 130 is coupled to register file 150 by internal bus 170. Register file 150 represents a storage area on processor 109 for storing information, including data. Execution unit 130 is further coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition. Decoder 165 may be implemented using any number of different mechanisms (e.g., a lookup table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

FIG. 1 additionally shows a data storage device 107, such as a magnetic disk or optical disk, and its corresponding disk drive, coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer network. Computer system 100 optionally includes video digitizing device 126. Video digitizing device 126 can be used to capture video images that can be transmitted to others on the computer network.

In one embodiment, the processor 109 additionally supports an instruction set which is compatible with the x86 instruction set used by existing processors (such as the Pentium® processor) manufactured by Intel Corporation of Santa Clara, Calif. Thus, in one embodiment, processor 109 supports all the operations supported in the IA™—Intel Architecture, as defined by Intel Corporation of Santa Clara, Calif. (see *Microprocessors*, Intel Data Books volume 1 and volume 2, 1992 and 1993, available from Intel of Santa Clara, Calif. As a result, processor 109 can support existing x86 operations in addition to the operations of the invention. While the invention is described as being incorporated into an x86 based instruction set, alternative embodiments could incorporate the invention into other instruction sets. For example, the invention could be incorporated into a 64-bit processor using a new instruction set.

Figure 2:
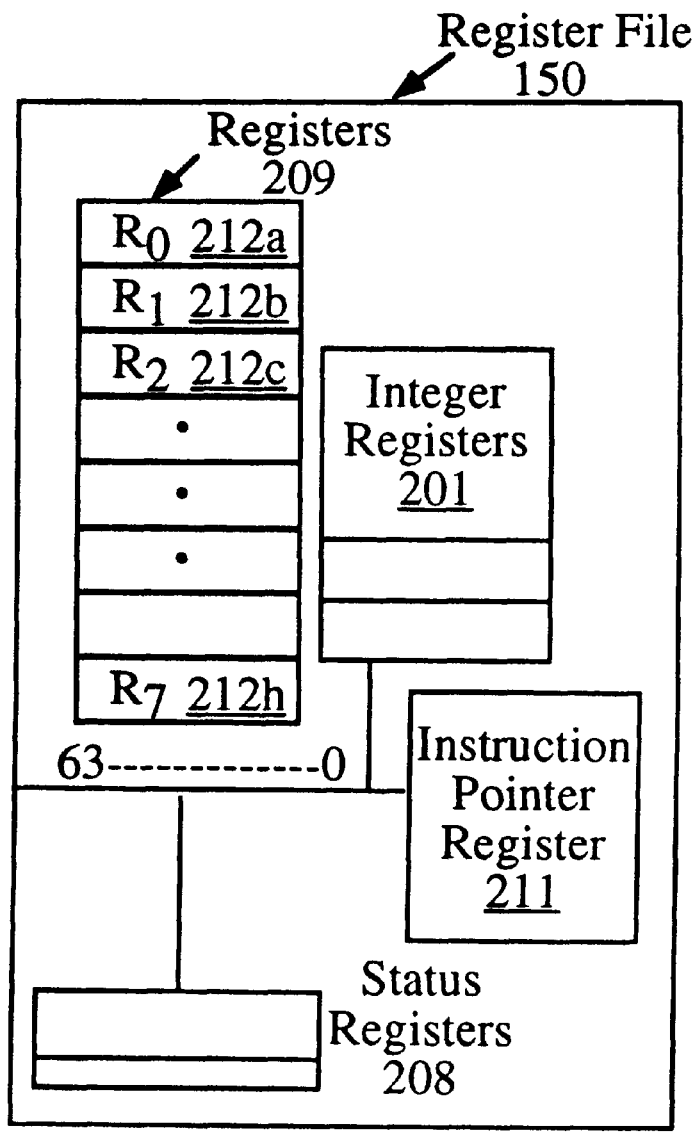
FIG. 2 illustrates a register file of the processor according to one embodiment of the invention.

FIG. 2 illustrates the register file of the processor according to one embodiment of the invention. The register file 150 is used for storing information, including control/status information, integer data, floating point data, and packed data. In the embodiment shown in FIG. 2, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Any additional registers would also be coupled to internal bus 170.

In one embodiment, the registers 209 are used for both packed data and floating point data. In one such embodiment, the processor 109, at any given time, must treat the registers 209 as being either stack referenced floating point registers or non-stack referenced packed data registers. In this embodiment, a mechanism is included to allow the processor 109 to switch between operating on registers 209 as stack referenced floating point registers and non-stack referenced packed data registers. In another such embodiment, the processor 109 may simultaneously operate on registers 209 as non-stack referenced floating point and packed data registers. As another example, in another embodiment, these same registers may be used for storing integer data.

Of course, alternative embodiments may be implemented to contain more or fewer sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contain eight registers, $R_0$ 212a through $R_7$ 212h. $R_1$ 212b, $R_2$ 212c and $R_3$ 212d are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209.

Figure 3:
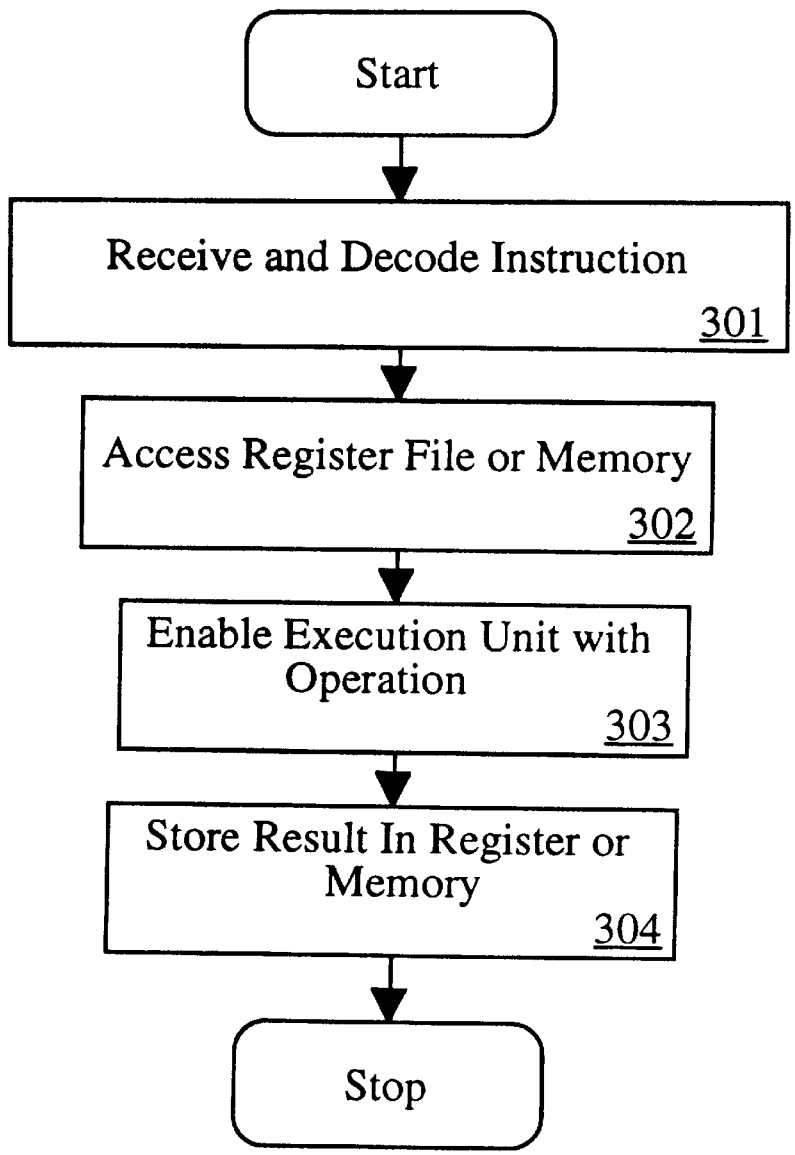
FIG. 3 is a flow diagram illustrating the general steps used by the processor to manipulate data according to one embodiment of the invention.

FIG. 3 is a flow diagram illustrating the general steps used by the processor to manipulate data according to one embodiment of the invention. That is, FIG. 3 illustrates the steps followed by processor 109 while performing an operation on packed data, performing an operation on unpacked data, or performing some other operation. For example, such operations include a load operation to load a register in register file 150 with data from cache 160, main memory 104, read only memory (ROM) 106, or data storage device 107.

At step 301, the decoder 165 receives a control signal from either the cache 160 or bus 101. Decoder 165 decodes the control signal to determine the operations to be performed.

At step 302, Decoder 165 accesses the register file 150, or a location in memory. Registers in the register file 150, or memory locations in the memory, are accessed depending on the register address specified in the control signal. For example, for an operation on packed data, the control signal can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the invention, any one, or all, of SRC1, SRC2 and DEST, can define a memory location in the addressable memory space of processor 109. For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, these accesses could be made to memory instead.

At step 303, execution unit 130 is enabled to perform the operation on the accessed data. At step 304, the result is stored back into register file 150 according to requirements of the control signal.

DATA AND STORAGE FORMATS

Figure 4:
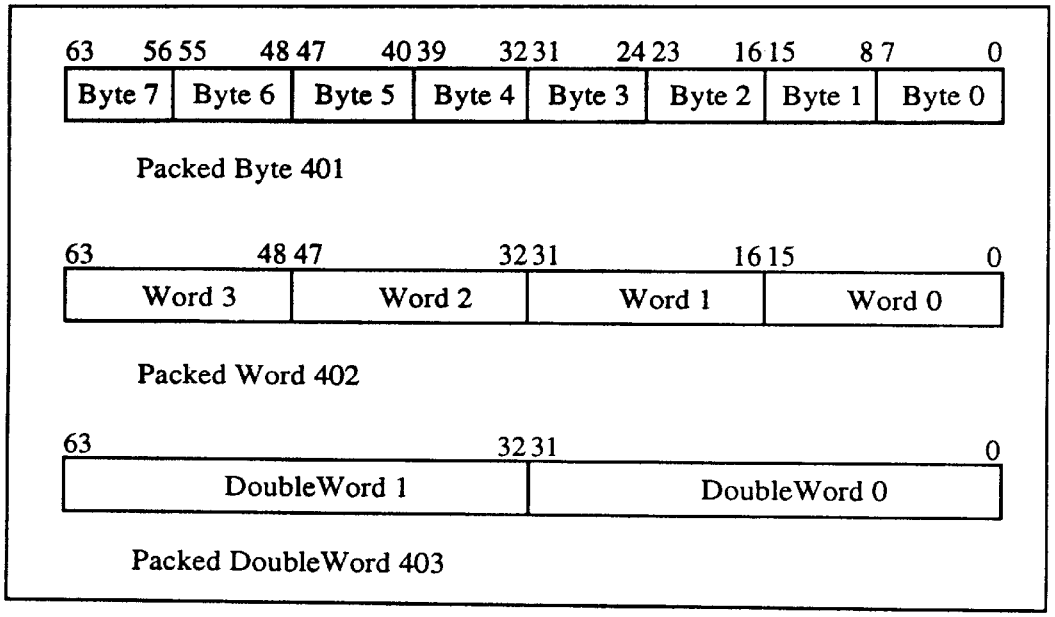
FIG. 4 illustrates packed data-types according to one embodiment of the invention.

FIG. 4 illustrates packed data-types according to one embodiment of the invention. Three packed data formats are illustrated; packed byte 401, packed word 402, and packed doubleword 403. Packed byte, in one embodiment of the invention, is sixty-four bits long containing eight data elements. Each data element is one byte long. Generally, a data element is an individual piece of data that is stored in a single register (or memory location) with other data elements of the same length. In one embodiment of the invention, the number of data elements stored in a register is sixty-four bits divided by the length in bits of a data element.

Packed word 402 is sixty-four bits long and contains four word 402 data elements. Each word 402 data element contains sixteen bits of information.

Packed doubleword 403 is sixty-four bits long and contains two doubleword 403 data elements. Each doubleword 403 data element contains thirty-two bits of information.

FIG. 5a through 5c illustrate the in-register packed data storage representation according to one embodiment of the invention. Unsigned packed byte in-register representation 510 illustrates the storage of an unsigned packed byte 401 in one of the registers $R_0$ 212a through $R_7$ 212h. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 illustrates the storage of a signed packed byte 401. Note that the eighth bit of every byte data element is the sign indicator.

Unsigned packed word in-register representation 512 illustrates how word three through word zero are stored in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that the sixteenth bit of each word data element is the sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and floating point data. In this embodiment of the invention, the individual programming processor 109 may be required to track whether an addressed register, $R_0$ 212a for example, is storing packed data or floating point data. In an alternative embodiment, processor 109 could track the type of data stored in individual registers of registers 209. This alternative embodiment could then generate errors if, for example, a packed addition operation were attempted on floating point data.

CONTROL SIGNAL FORMATS

The following describes one embodiment of the control signal formats used by processor 109 to manipulate packed data. In one embodiment of the invention, control signals are represented as thirty-two bits. Decoder 165 may receive the control signal from bus 101. In another embodiment, decoder 165 can also receive such control signals from cache 160.

Figure 6A:
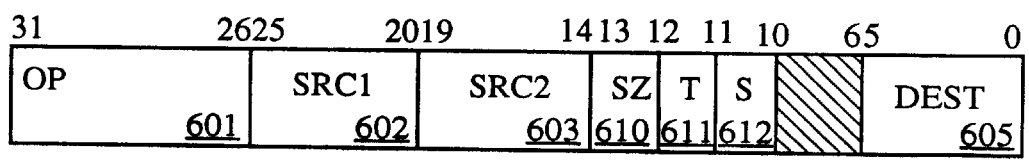
FIG. 6a illustrates a control signal format for indicating the use of packed data according to one embodiment of the invention.

FIG. 6a illustrates a control signal format for indicating the use of packed data according to one embodiment of the invention. Operation field OP 601, bit thirty-one through bit twenty-six, provides information about the operation to be performed by processor 109; for example, packed addition, etc . . . SRC1 602, bit twenty-five through bit twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $0_{12}$, then the packed data is formatted as packed byte 401. If SZ 610 equals $10_2$, then the packed data is formatted as packed word 402. SZ 610 equaling $00_2$ or $11_2$ is reserved, however, in another embodiment, one of these values could be used to indicate packed doubleword 403.

Control bit T 611, bit eleven, indicates whether the operation is to be carried out with saturate mode. If T 611 equals one, then a saturating operation is performed. If T 611 equals zero, then a non-saturating operation is performed. Saturating operations will be described later.

Control bit S 612, bit ten, indicates the use of a signed operation. If S 612 equals one, then a signed operation is performed. If S 612 equals zero, then an unsigned operation is performed.

Figure 6B:
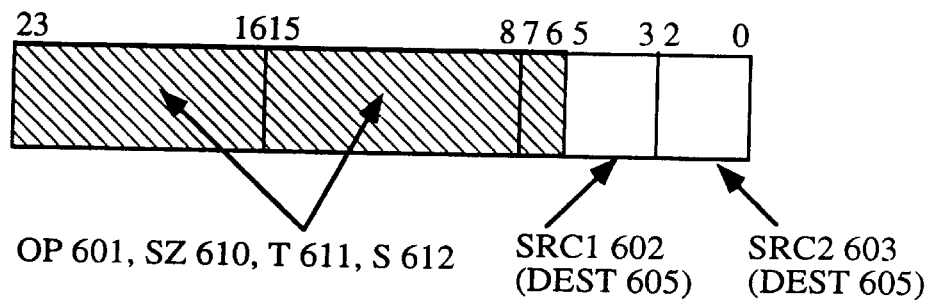
FIG. 6b illustrates a second control signal format for indicating the use of packed data according to one embodiment of the invention.

FIG. 6b illustrates a second control signal format for indicating the use of packed data according to one embodiment of the invention. This format corresponds with the general integer opcode format described in the "Pentium Processor Family User's Manual," available from Intel Corporation, Literature Sales, P.O. Box 7641, Mt. prospect, Ill., 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal. This is described in more detail in the "Pentium Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

DESCRIPTION OF SATURATE/UNSATURATE

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 4.

TABLE 4

| Data Format | Minimum Value | Maximum Value |
|---|---|---|
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{64}-1$ |
| Signed Doubleword | $-2^{63}$ | $2^{63}-1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

MULTIPLY-ADD OPERATION

In one embodiment of the invention, the SRC1 register contains packed data (Source1), the SRC2 register contains packed data (Source2), and the DEST register will contain the result (Result) of performing the multiply-add operation on Source1 and Source2. In the first step of the multiply-add operation, Source1 will have each data element independently multiplied by the respective data element of Source2 to generate a set of respective intermediate results. These intermediate results are summed by pairs to generate the Result for the multiply-add operation.

In one embodiment of the invention, the multiply-add operation operates on signed packed data and truncates the results to avoid any overflows. In addition, the operation operates on packed word data and the Result is a packed double word. However, alternative embodiments could support the operation for other packed data types.

Figure 7:
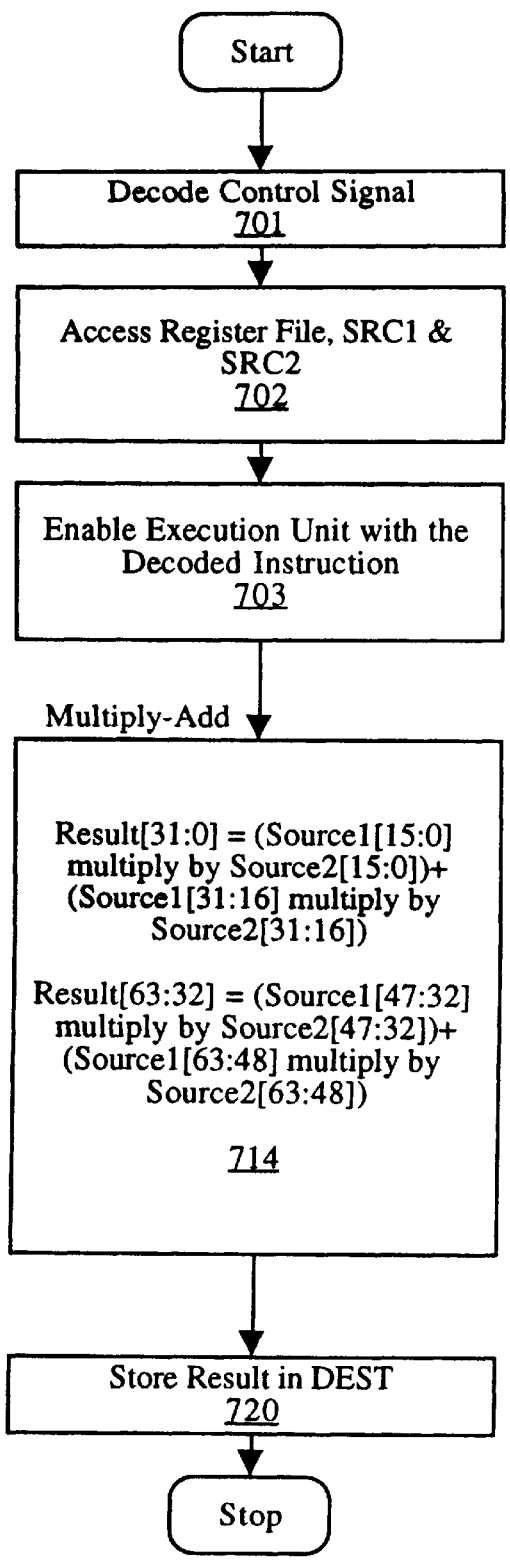
FIG. 7 is a flow diagram illustrating steps for performing a multiply-add operation on packed data according to one embodiment of the invention.

FIG. 7 is a flow diagram illustrating the steps for performing multiply-add operations on packed data according to one embodiment of the invention.

At step 701, decoder 165 decodes the control signal received by processor 109. Thus, decoder 165 decodes: the operation code for a multiply-add operation.

At step 702, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). That is, registers 209 communicate the packed data to execution unit 130 via internal bus 170.

At step 703, decoder 165 enables the multiply-add unit 145 of the execution unit 130 to perform the instruction. In step 714, the following is performed. Source1 bits fifteen through zero are multiplied by Source2 bits fifteen through zero generating a first 32-bit intermediate result (Intermediate Result 1). Source bits thirty-one through sixteen are multiplied by Source2 bits thirty-one through sixteen generating a second 32-bit intermediate result (Intermediate Result 2). Source1 bits forty-seven through thirty-two are multiplied by Source2 bits forty-seven through thirty-two generating a third 32-bit intermediate result (Intermediate Result 3). Source1 bits sixty-three through forty-eight are multiplied by Source2 bits sixty-three through forty-eight generating a fourth 32-bit intermediate result (Intermediate Result 4). Intermediate Result 1 is added to Intermediate Result 2 generating Result bits thirty-one through 0, and Intermediate Result 3 is added to Intermediate Result 4 generating Result bits sixty-three through thirty-two.

Different embodiments may perform the multiplies and adds serially, in parallel, or in some combination of serial and parallel operations.

At step 720, the Result is stored in the DEST register.

PACKED DATA MULTIPLY-ADD CIRCUIT

In one embodiment, the multiply-add operations can execute on multiple data elements in the same number of clock cycles as a single multiply on unpacked data. To achieve execution in the same number of clock cycles, parallelism is used. That is, registers are simultaneously instructed to perform the multiply-add operations on the data elements.

Figure 8:
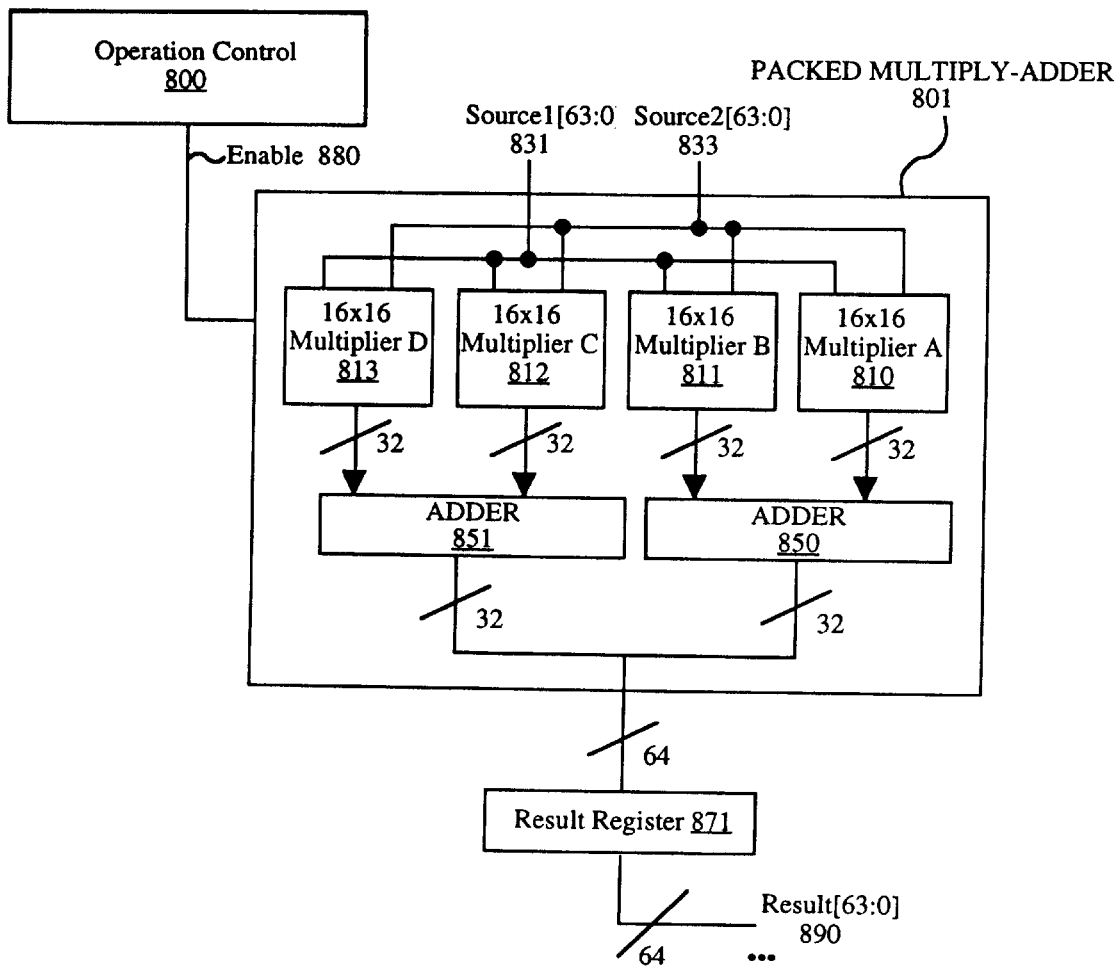
FIG. 8 illustrates a circuit for performing multiply-add operations on packed data according to one embodiment of the invention.

In summary, FIG. 8 illustrates a circuit for performing multiply-add operations on packed data according to one embodiment of the invention. Operation control 800 processes the control signal for the multiply-add instructions. Operation control 800 outputs signals on Enable 880 to control Packed multiply-adder 801.

Packed multiply-adder 801 has the following inputs: Source1[63:0] 831, Source2[63:0] 833, and Enable 880. Packed multiply-adder 801 includes four 16×16 multiplier circuits: 16×16 multiplier A 810, 16×16 multiplier B 811, 16×16 multiplier C 812 and 16×16 multiplier D 813. 16×16 multiplier A 810 has as inputs Source[15:0] and Source2 [15:0]. 16×16 multiplier B 811 has as inputs Source1[31:16] and Source2[31:16]. 16×16 multiplier C 812 has as inputs Source1[47:32] and Source2[47:32]. 16×16 multiplier D 813 has as inputs Source1[63:48] and Source2[63:48]. The 32-bit intermediate results generated by 16×16 multiplier A 810 and 16×16 multiplier B 811 are received by adder 1350, while the 32-bit intermediate results generated by 16×16 multiplier C 812 and 16×16 multiplier D 813 are received by adder 851.

The adder 850 and adder 851 add their respective 32-bit inputs. The output of adder 850 (i.e., Result bits 31 through zero of the Result) and the output of adder 851 (i.e., bits 63 through 32 of the Result) are combined into the 64-bit Result and communicated to Result Register 871.

In one embodiment, each of adder 851 and adder 850 is composed of a 32-bit adder with the appropriate propagation delays. However, alternative embodiments could implement adder 851 and adder 850 in any number of ways.

Performing the equivalent of this multiply-add instruction using the prior art DSP processor described with reference to Table 1 requires one instruction to zero the accumulation value and four multiply accumulate instructions. Performing the equivalent of this multiply-add instruction using the prior art DSP processor described with reference to Table 2 requires one instruction to zero the accumulation value and 2-accumulate instructions.

In one embodiment of the multiply-add unit 145 of the present invention, each 16-bit multiplier used for the packed multiplication operations in the present invention is implemented using a 2-bit Booth algorithm. The main purpose of Booth algorithm in multipliers is to reduce the number of partial products to be summed. Fewer partial products consequently reduces the hardware and the area requirement for the multiplier. Table 5 below describes a common 16-bit multiplication process where 16 partial products are generated. Each partial product is shifted to the left by one bit and contains either all "0" terms or the exact replica of the multiplicand, depending on whether the respective bit of the multiplier is a "1" or a "0". A 32-bit result is generated by summing all 16 partial products (pp).

TABLE 5

|  |  |  |  |  |  |  |  |  |  |  |  |  |  |  | x | x | 16-bit multiplicand |
|---|---|---|---|---|---|---|---|---|---|---|---|---|---|---|---|---|---|
|  |  |  |  |  |  |  |  |  |  |  |  |  |  |  | x | x | 16-bit multiplier |
|  |  |  |  |  |  |  |  |  |  |  |  |  |  |  | x | x | pp0 |
|  |  |  |  |  |  |  |  |  |  |  |  |  |  | x | x |  | pp1 |
|  |  |  |  |  |  |  |  |  |  |  |  |  | x | x |  |  | pp2 |
|  |  |  |  |  |  |  |  |  |  |  |  | x | x |  |  |  | pp3 |
|  |  |  |  |  |  |  |  |  |  |  | x | x |  |  |  |  | pp4 |
|  |  |  |  |  |  |  |  |  |  | x | x |  |  |  |  |  | pp5 |
|  |  |  |  |  |  |  |  |  | x | x |  |  |  |  |  |  | pp6 |
|  |  |  |  |  |  |  |  | x | x |  |  |  |  |  |  |  | pp7 |
|  |  |  |  |  |  |  | x | x |  |  |  |  |  |  |  |  | pp8 |
|  |  |  |  |  |  | x | x |  |  |  |  |  |  |  |  |  | pp9 |
|  |  |  |  |  | x | x |  |  |  |  |  |  |  |  |  |  | pp10 |
|  |  |  |  | x | x |  |  |  |  |  |  |  |  |  |  |  | pp11 |
|  |  |  | x | x |  |  |  |  |  |  |  |  |  |  |  |  | pp12 |
|  |  | x | x |  |  |  |  |  |  |  |  |  |  |  |  |  | pp13 |
|  | x | x |  |  |  |  |  |  |  |  |  |  |  |  |  |  | pp14 |
| x | x |  |  |  |  |  |  |  |  |  |  |  |  |  |  |  | pp15 |
| x | x | x | x | x | x | x | x | x | x | x | x | x | x | x | x | x | 32-bit result |

On the other hand, the 2-bit Booth multiplier shown below in table 6 operates differently. In this case there are a total of 8 partial products and each partial product is 17 long bits. Every partial product has its own Booth encoder which dictates what the contents of the respective partial product are. In alternative embodiments, other Booth encoder schemes could be used to select partial products.

A typical 2-bit Booth encoder has five outputs, which are for zero, plus 1, plus 2, minus 1, and minus 2 operations. Its truth table is given below in Table 6.

TABLE 6

BOOTH = $-2y_k + y_k + y_{k-1}$

| $y_{k+1}$ | YK | $y_{k-1}$ | BOOTH | |
|---|---|---|---|---|
| 0 | 0 | 0 | 0 | zero (Z) |
| 0 | 0 | 1 | 1 | plus1 (P1) |
| 0 | 1 | 0 | 1 | plus1 (P2) |
| 0 | 1 | 1 | 2 | plus2 (M2) |
| 1 | 0 | 0 | −2 | minus2 (M2) |
| 1 | 0 | 1 | −1 | minus1 (M1) |
| 1 | 1 | 0 | −1 | minus1 (M1) |
| 1 | 1 | 1 | 0 | zero (Z) |

As set forth in Table 6, $y_{k+1}$, $y_k$ and $y_{k-1}$ are the adjacent multiplier bits in order of significance. Table 7 below, further describes the form of the partial according to the Booth encoder outputs.

Instead of sign extending the partial products, a sign generate method is used to reduce the number of Carry Save Address (CSA's) needed for partial product reduction. Table 8 shows the sign generate method. The complement of the sign bit of a partial product is appended to the partial product. Two one bits are then appended to the complement of the sign bit.

TABLE 8

| Sign-extension method | Sign-generate method |
|---|---|
|  | 1 |
| S1 S1 S1 partial product 1 | 1 S1 partial product 1 |
| S2 S2 partial product 2 | 1 S2 partial product 2 |
| partial product 3 | 1 S3 partial product 3 |

Table 9 below shows the 16-bit multiplication process used in one embodiment of the present invention using the 2-bit Booth encoder and the sign generate method to generate 8 partial products.

TABLE 7

| | |
|---|---|
| IF ZERO = 1 then | 17-bit zero string<br>0 0 0 0 0 0 0 0 0 0 0 0 0 0 0 0 0<br>n = 0 |
| IF PLUS1 = 1 then | 16-bit multiplicand<br>0 x x x x x x x x x x x x x x x x<br>n = 0 |
| IF PLUS2 = 1 then | 16-bit multiplicand left shifted by 1<br>x x x x x x x x x x x x x x x x 0<br>n = 0 |
| IF MINUS1 = 1 then | 16-bit multiplicand complemented<br>1 x̄ x̄ x̄ x̄ x̄ x̄ x̄ x̄ x̄ x̄ x̄ x̄ x̄ x̄ x̄ x̄<br>n = 1 |
| IF MINUS2 = 1 then | 16-bit multiplicand complemented and shifted left by 1<br>x̄ x̄ x̄ x̄ x̄ x̄ x̄ x̄ x̄ x̄ x̄ x̄ x̄ x̄ x̄ x̄ 1<br>n = 1 |

TABLE 9

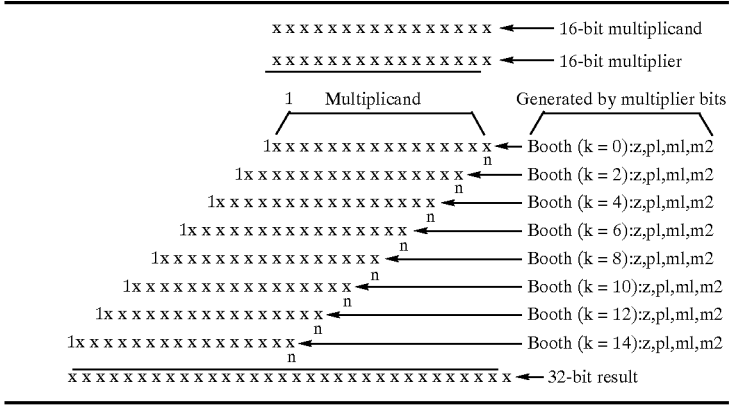

In one embodiment, each Booth encoder contains 3 adjacent multiplier bits (y0 is the least significant bit and y15 is the most significant bit of the multiplier bits). The form of the partial product is defined by 17 selectors and a negate circuit connected to a particular Booth encoder. The data bits of the selectors contain 2 adjacent multiplier bits, their compliments and Vcc (for zero operation). The selected outputs then go through a maze of partial product reduction tree, commonly referred to as a Wallace tree.

Once the partial products are all selected then the summation of partial products begins. The Wallace tree is made out of full adders and half adders. FIGS. 9a–9e illustrate the Wallace tree performing the partial product summation and reduction for one embodiment of the present invention, as implemented by each of the four 16-bit multipliers in the multiply-add unit 145. As illustrated, 8 partial products are reduced to 6 partial products, then to 4 partial products, then to 3 partial products, and then finally to 2 partial products.

More specifically, as illustrated in FIGS. 9a–9e, the subscript numbers in each row represent bits of a partial product ($a_{se15}$, $a_{s15}$, $a_{14}$–$a_0$). Each row represents a separate partial product. $Ne_{gh}$–$neg_a$ represent the +1 part of a 2's complement, for each partial product. As a result, if a certain Booth encoded bit of the multiplier is negative, that corresponding partial product's "neg" bit is 1, set forth in the next row.

In addition, as further illustrated in FIGS. 9a–9e, $S_{<position><adder\ number>}$ represents the sum portion of a carry-save adder. $_{<adder\ number>}$ indicates to which row of adders the sum belongs. Adders are numbered from top to bottom of FIGS. 9a–9e. $_{<position>}$ indicates which bit position (0 . . . 31) this adder operates. For example, $S_{42}$ is the sum of a carry-save adder 2 that corresponds to bit position 4.

$C_{<position><level>}$ represents the carry portion of a carry-save adder. $_{<level>}$ indicates the respective row of adders for the carry. $_{<position>}$ indicates which bit position (0 . . . 31) this adder operates. A carry-save adder can be a full adder, or a half-adder. A full adder adds 3 bits together. A half-adder adds 2 bits.

FIGS. 9a–9e further illustrate implementation of the Sign-Generate method as previously described. As illustrated, the Sign-Generate method creates a '1 on bit position 16 the in row above the first partial product row. In the last partial product row, if the most significant Booth encoding number is negative, a 1 is created in the row below because the partial product is 2's complemented. This process would typically require 10 rows instead of 8. The more rows a multiplication has, the more hardware is needed to reduce the partial products into 2 numbers on which a carry-propagate adder can add.

Figures 9A, 9B:
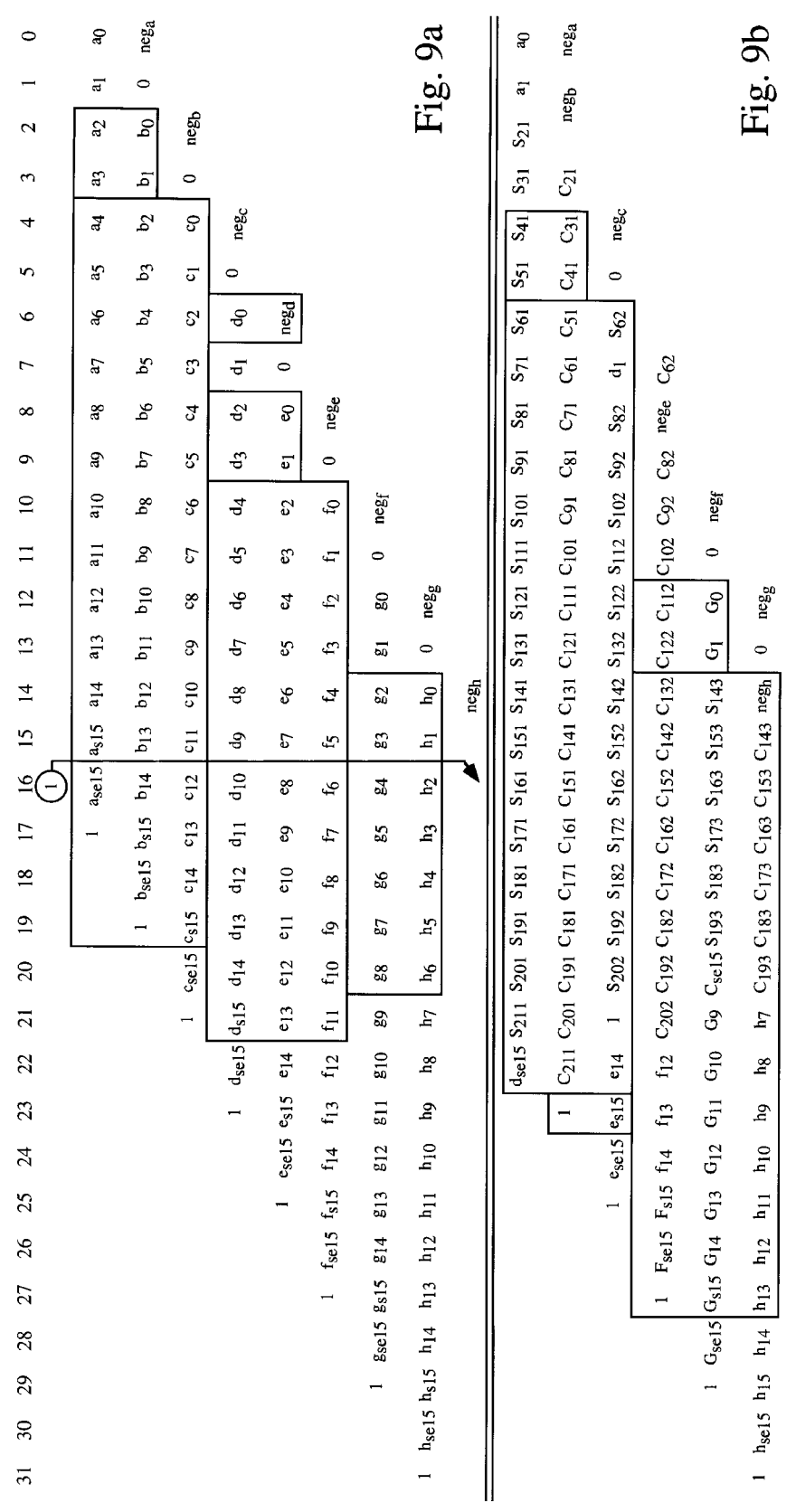

Binary multiplication, however, is performed through addition. When two numbers are added, the order of the numbers is irrelevant. The result is the same regardless of which number is the first number. This principle is used throughout the Wallace tree to reduce the number of carry-save's needed. Specifically, in one embodiment, the 1 in bit position 16 of the first row in FIG. 9a is moved down to bit position 16 in the last row of FIG. 9, which also contains $neg_h$. As a result, less hardware is needed to do the reduction because fewer rows are used.

Figures 9C, 9D, 9E:
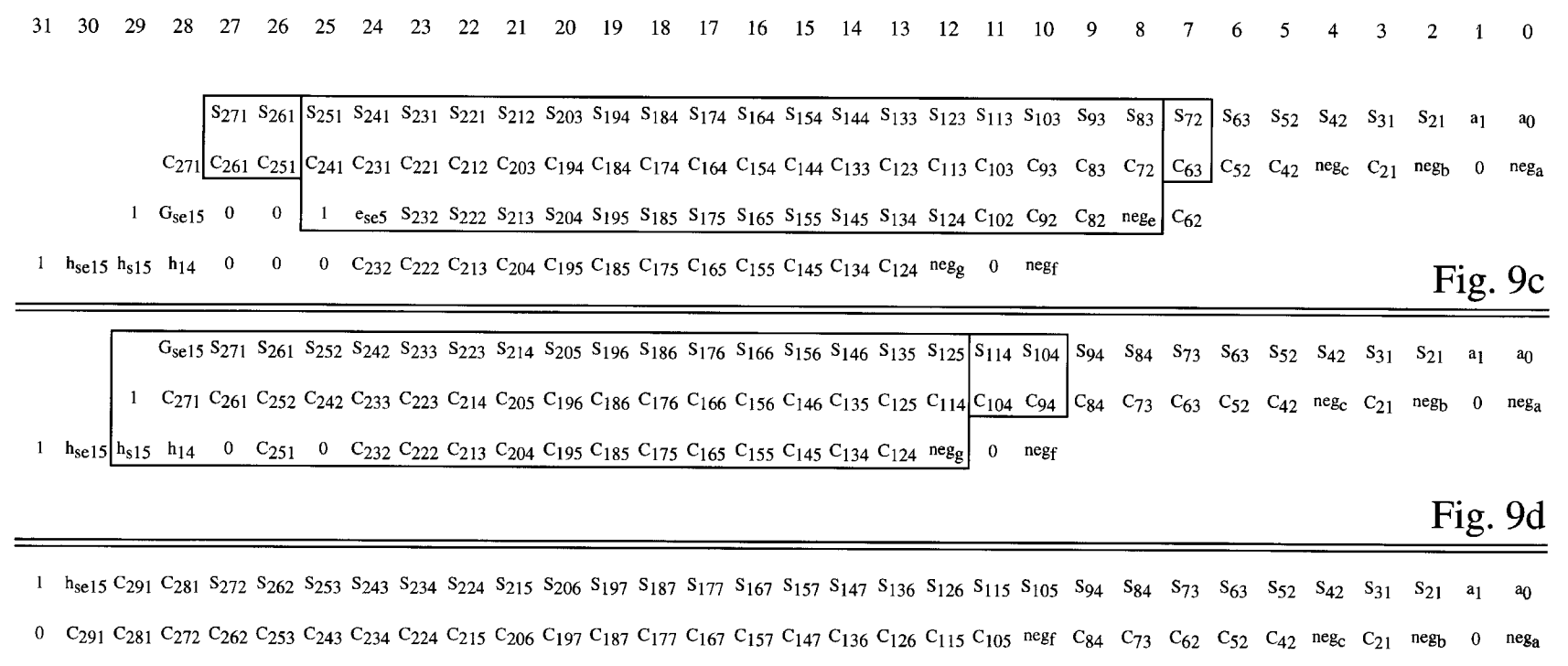

FIG. 9b illustrates the result of the first level of reduction. The boxes indicate which bits are operated on by carry-save adders. A number of bits are moved around to fit everything in 6 rows. For example, bit $d_{se15}$ is moved to the first row. $c_{se15}$ is moved to a fifth row. A bit, however, should only be moved up or down in the same bit position. From FIG. 9b to FIG. 9c, the number of rows is reduced to 4. From FIG. 9c to FIG. 9e, the number of rows is reduced to 3. Finally, one more row of carry-save adders reduces the number of rows to 2, as shown in FIG. 9e.

Figure 10A:
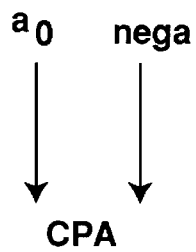
FIGS. 10a–10af illustrate one embodiment of a circuit implementing the Wallace Tree of FIGS. 9a–9e for one embodiment of the present invention.
Figure 10B:
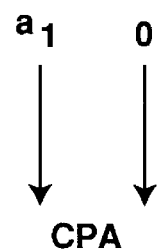
Figure 10C:
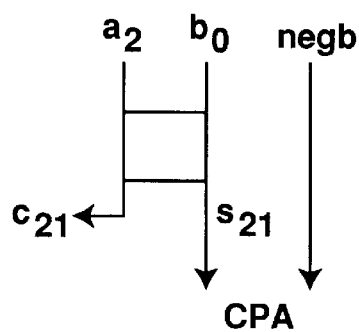
Figure 10D:
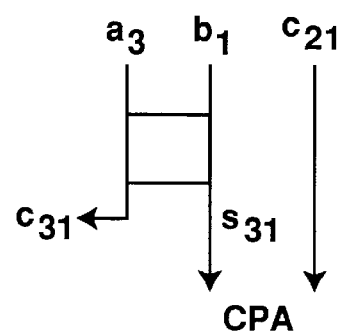
Figure 10E:
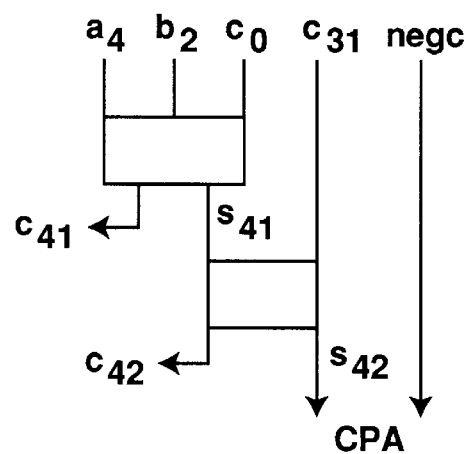
Figure 10F:
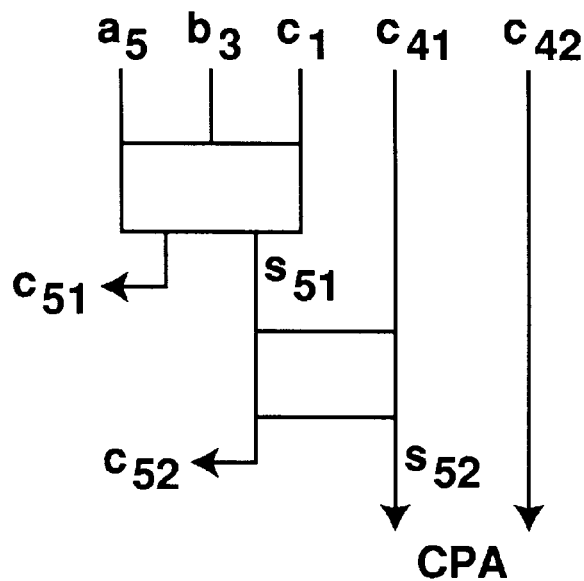
Figure 10G:
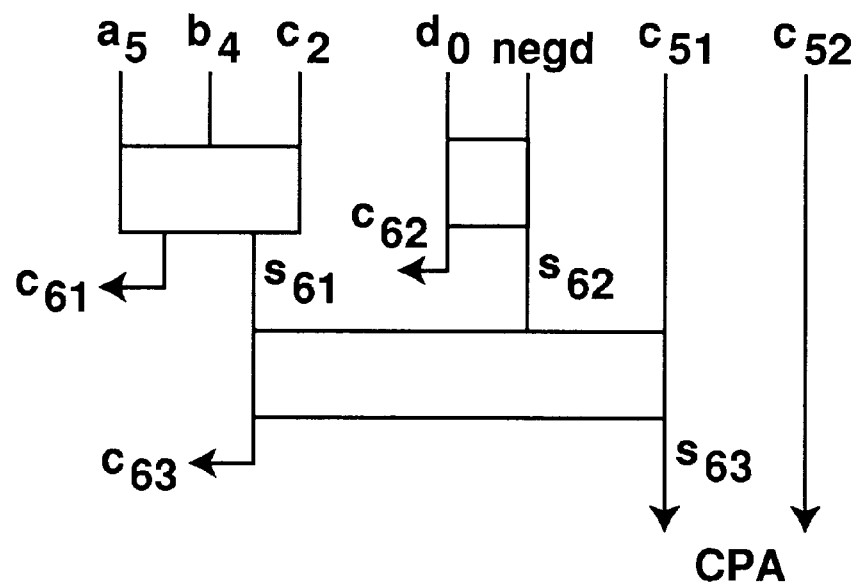
Figure 10H:
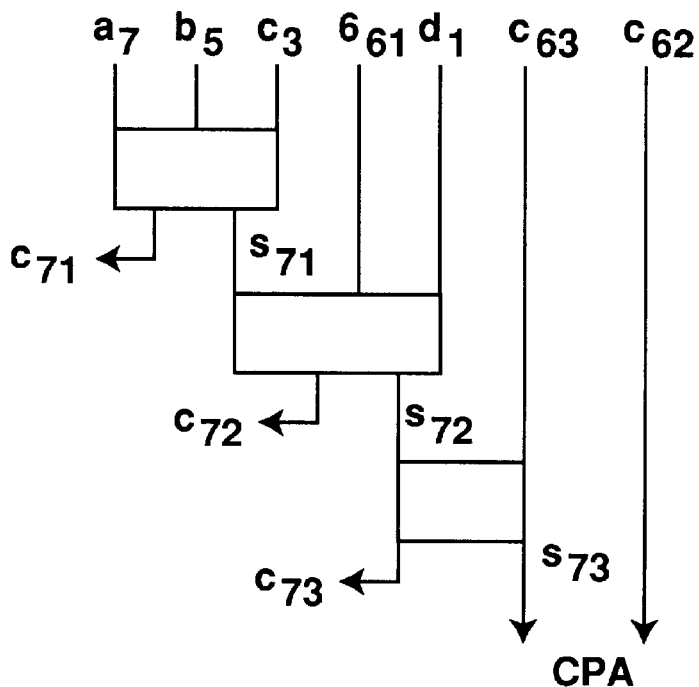
Figure 10I:
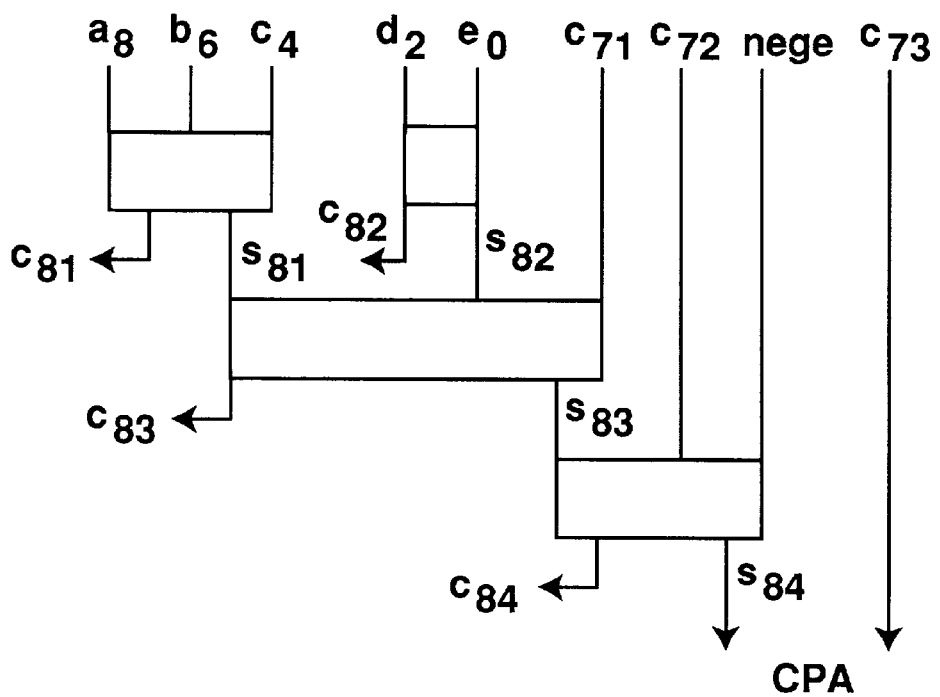
Figure 10J:
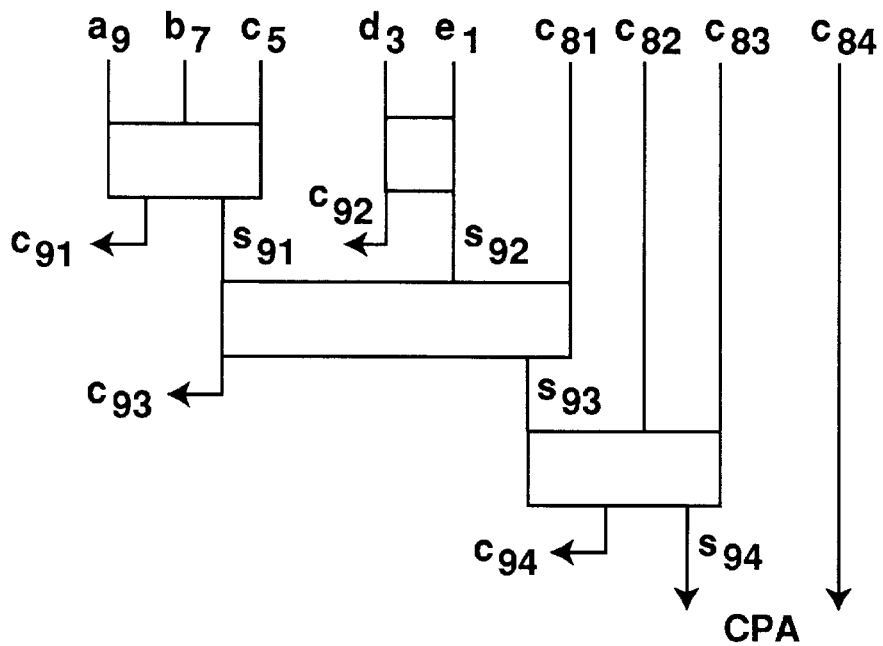
Figure 10K:
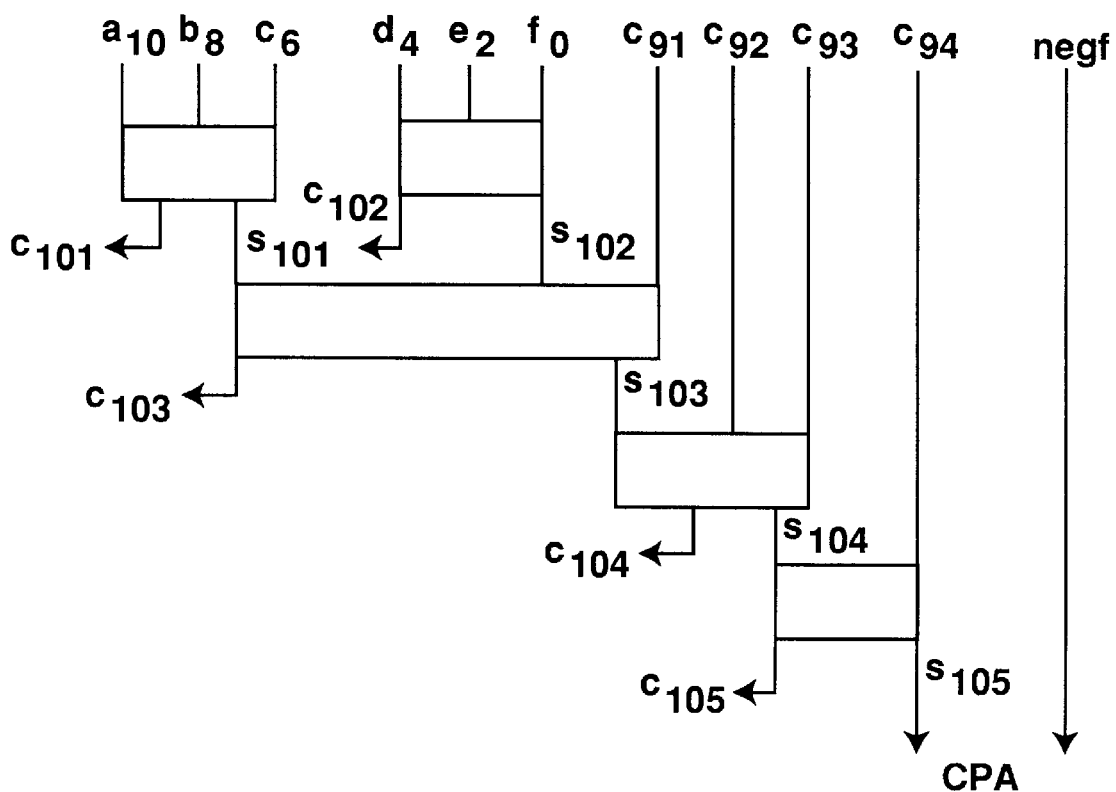
Figure 10L:
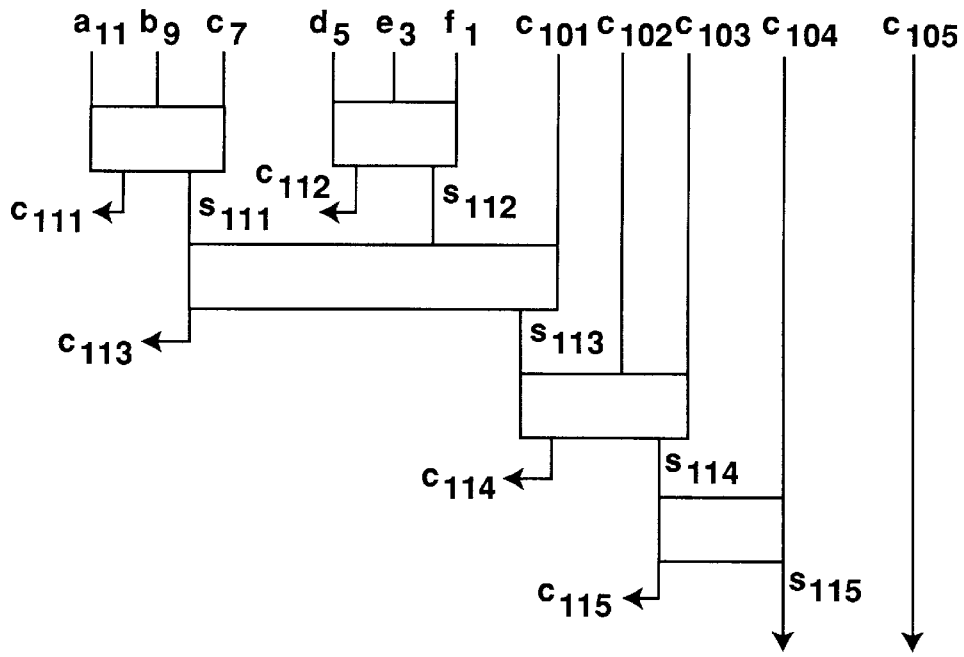
Figure 10M:
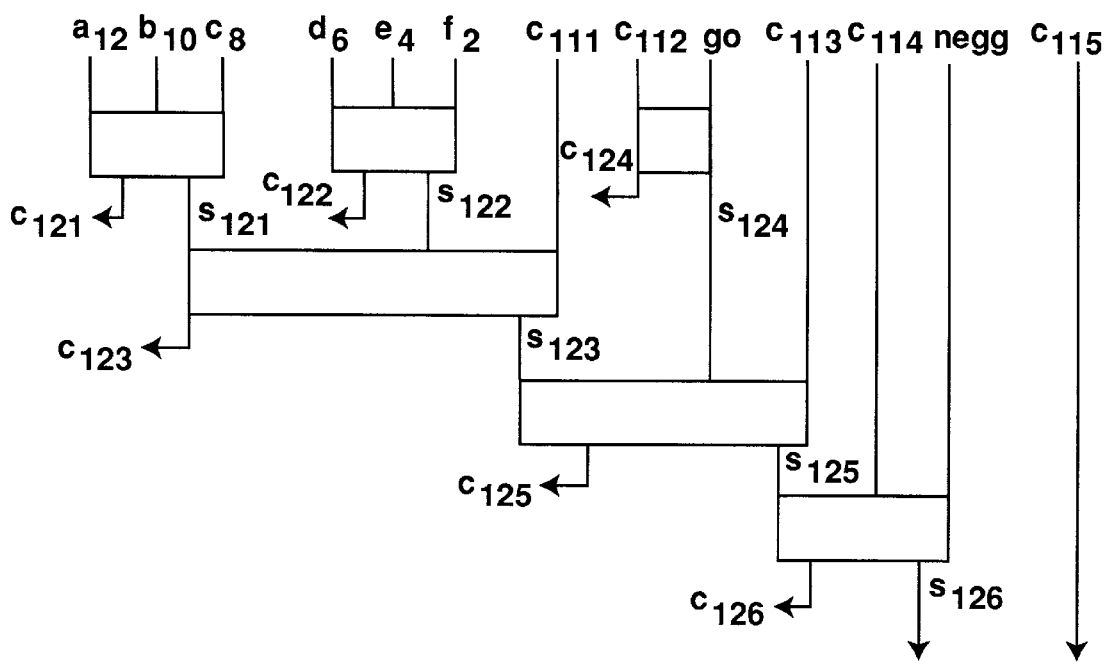
Figure 10N:
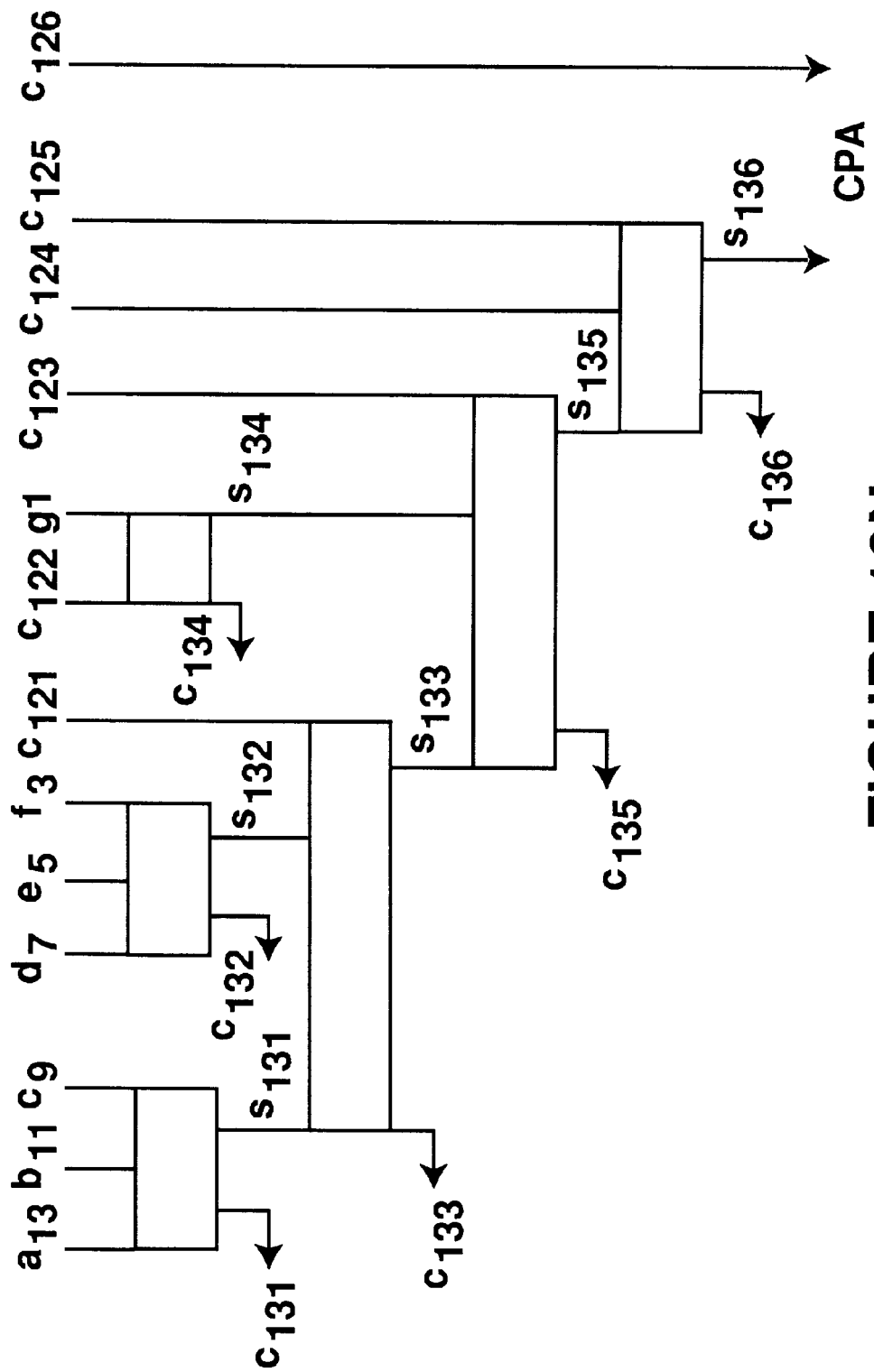
Figure 10O:
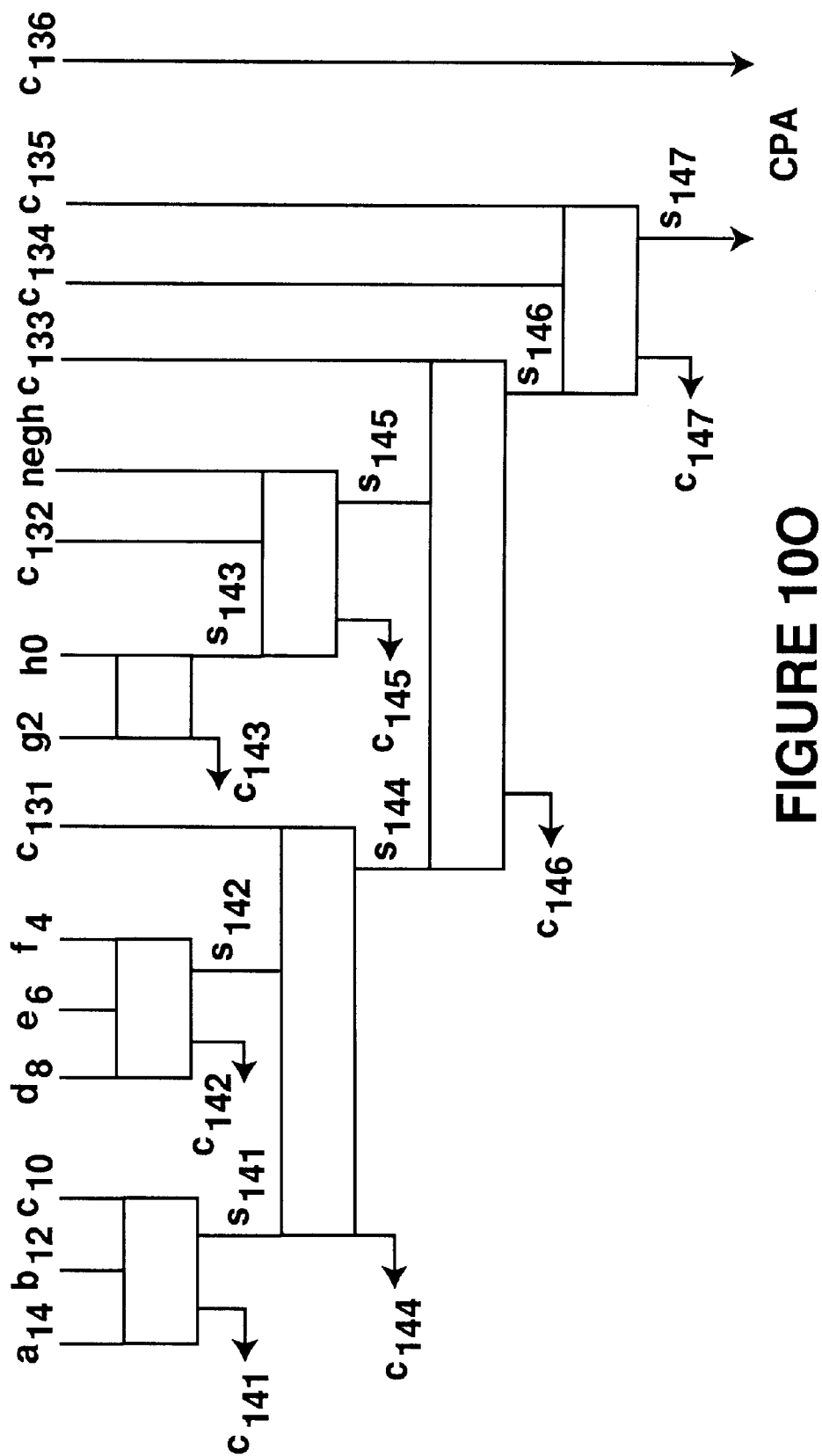
Figure 10P:
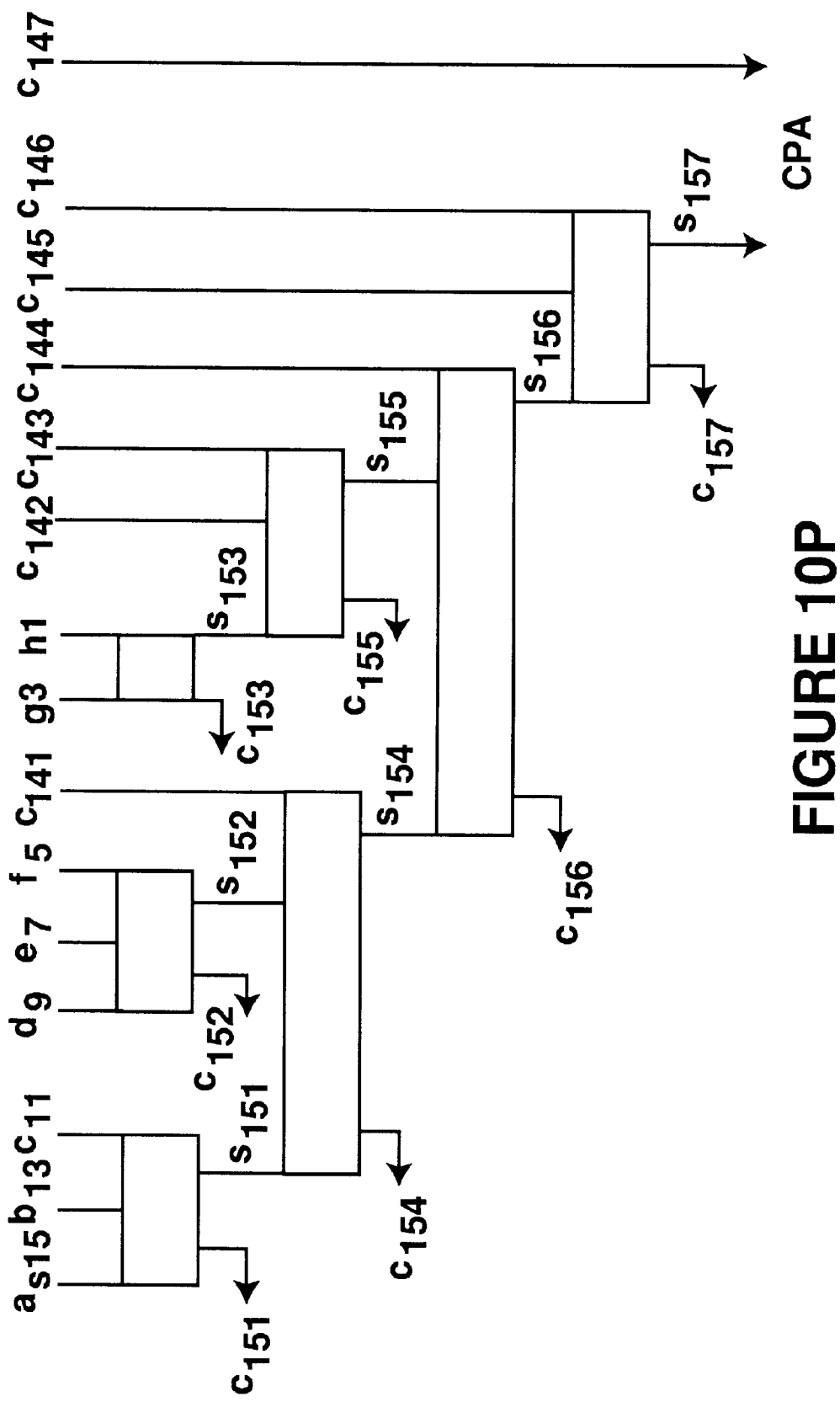
Figure 10Q:
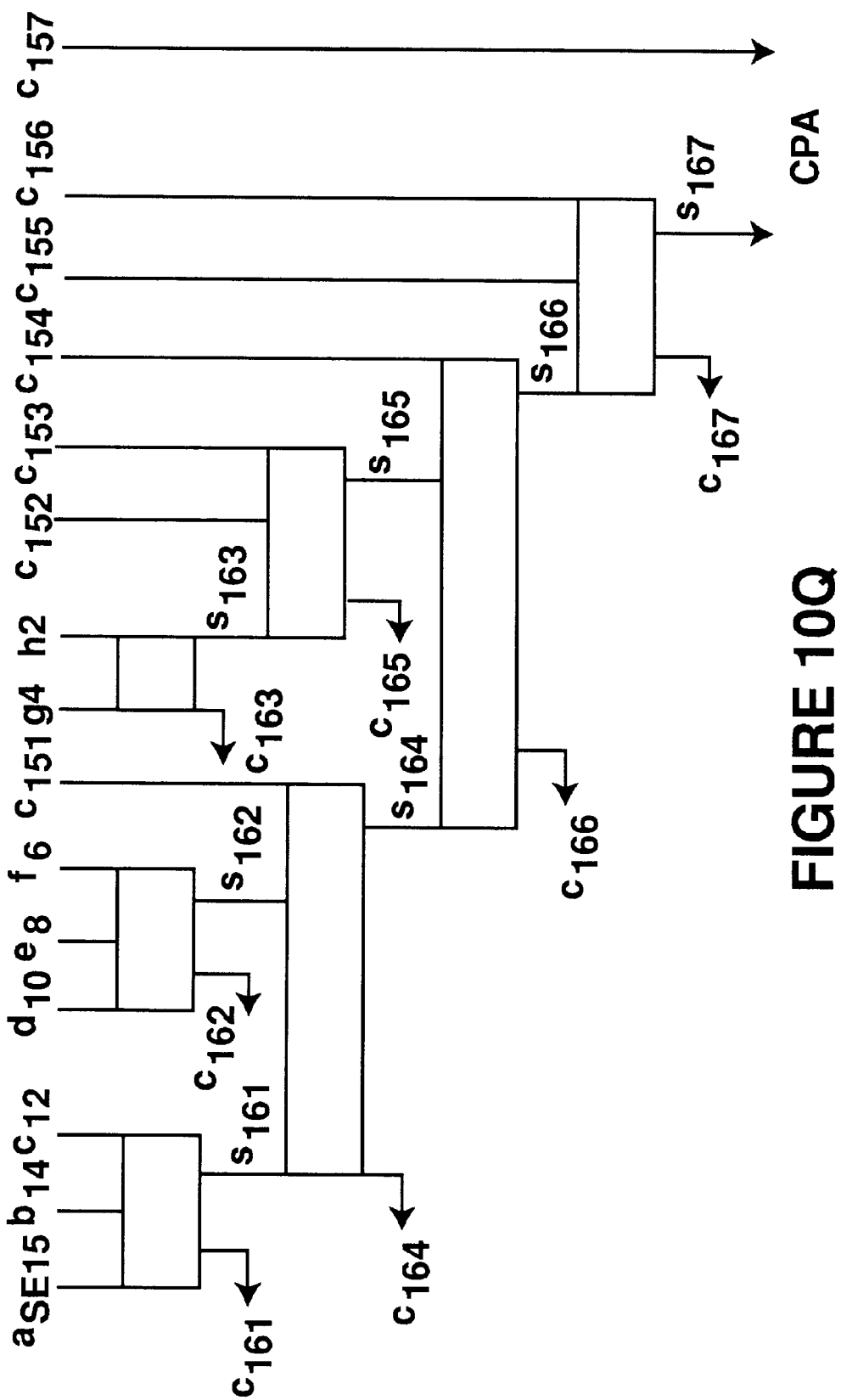
Figure 10R:
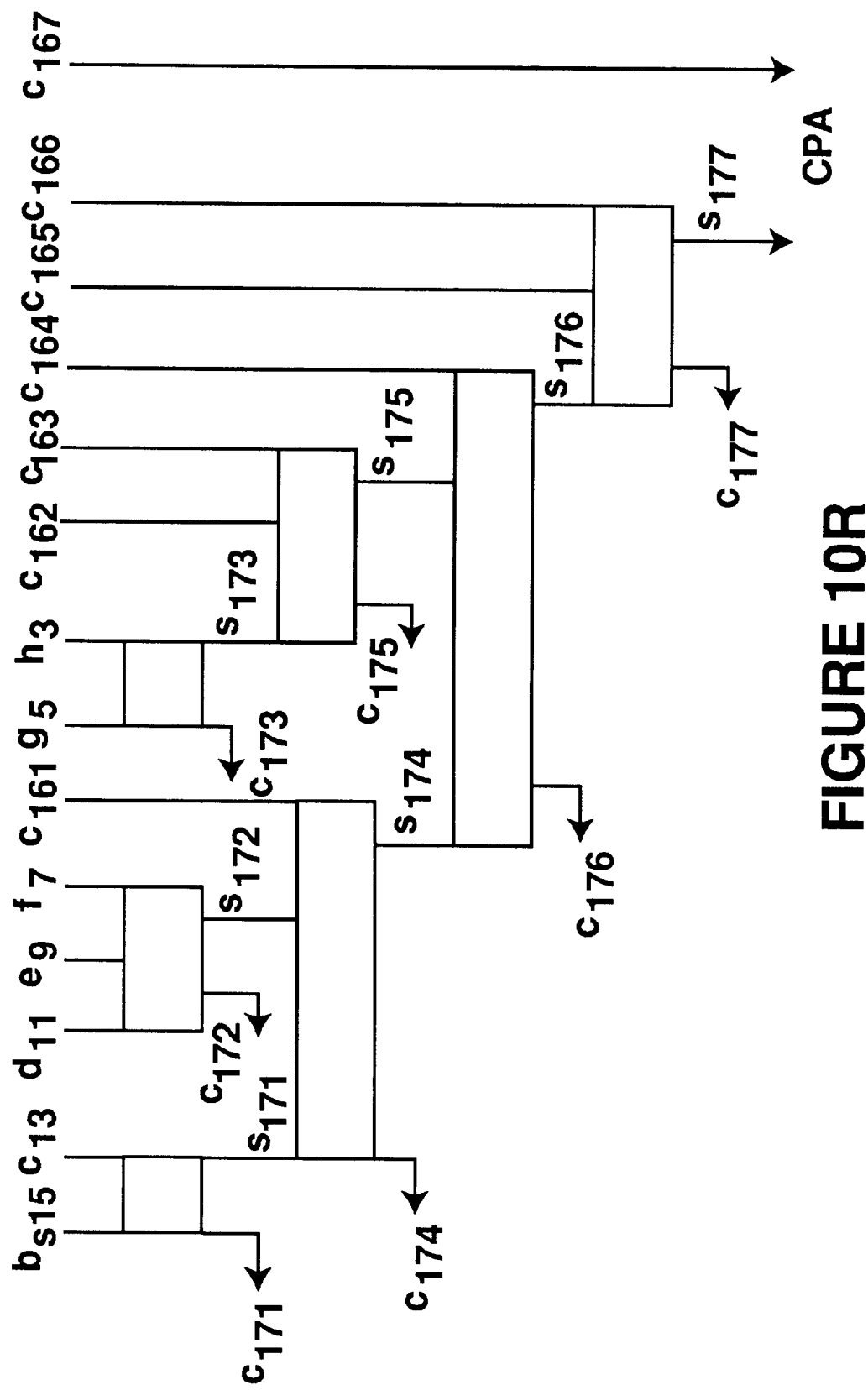
Figure 10S:
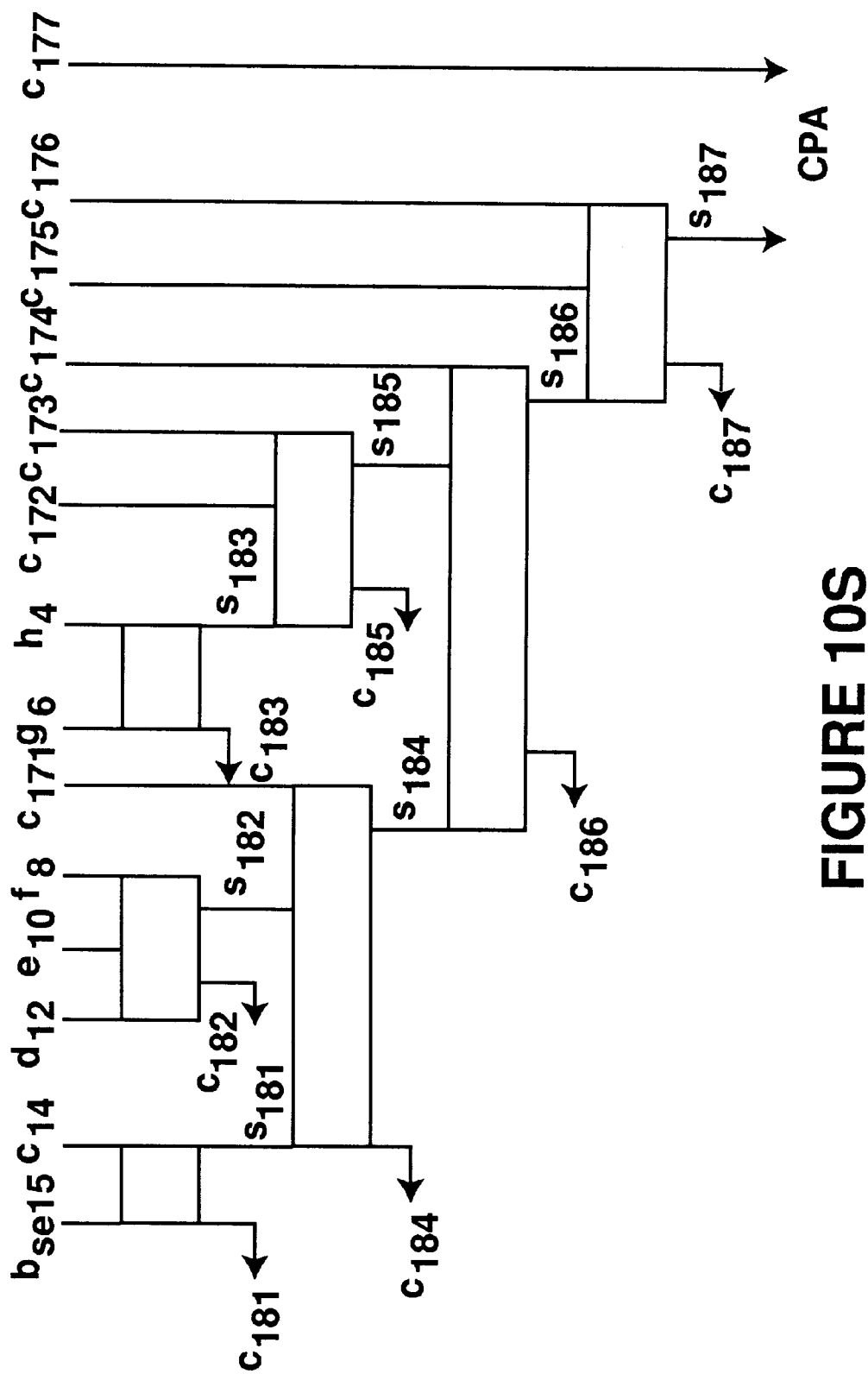
Figure 10T:
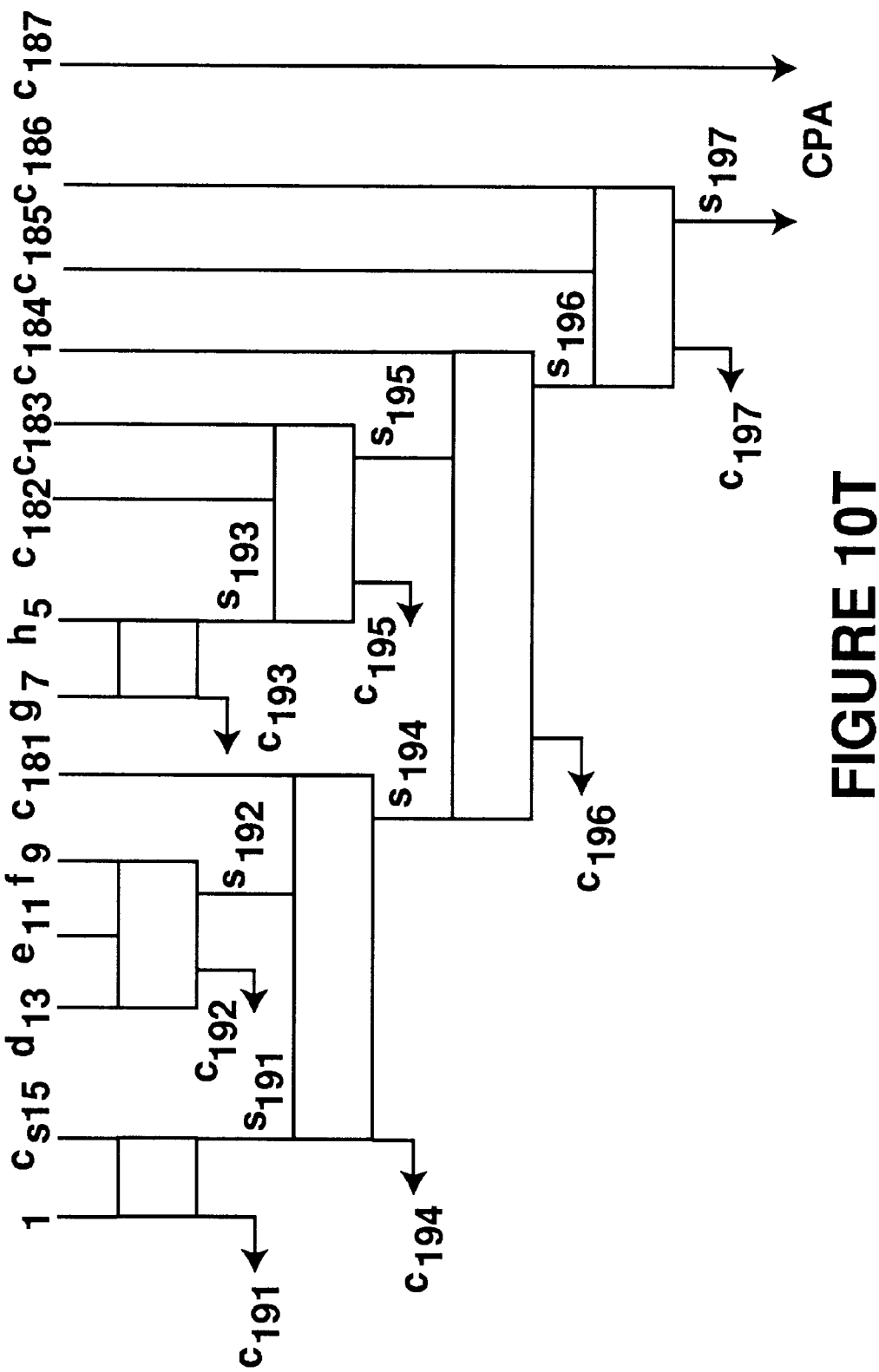
Figure 10U:
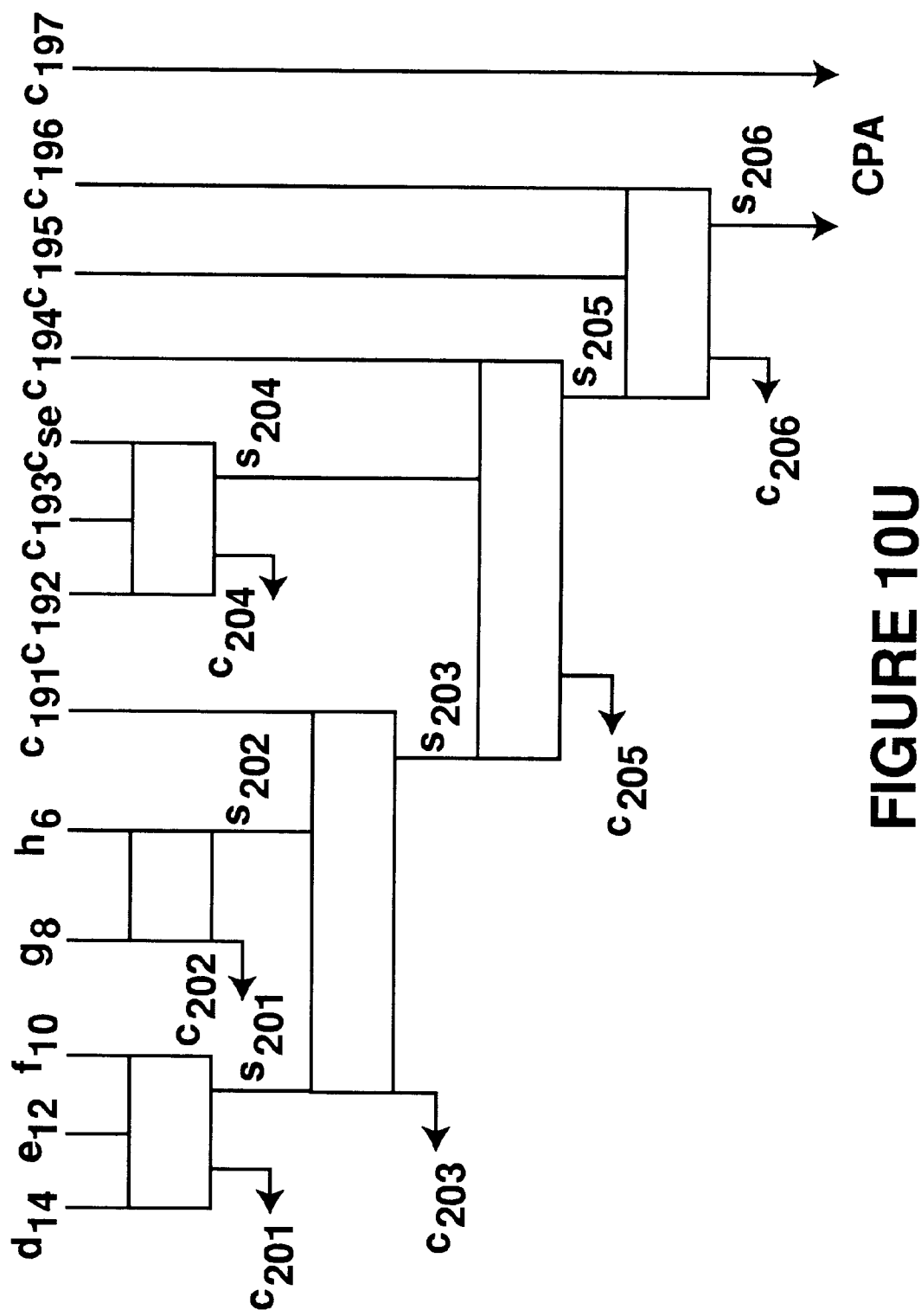
Figure 10V:
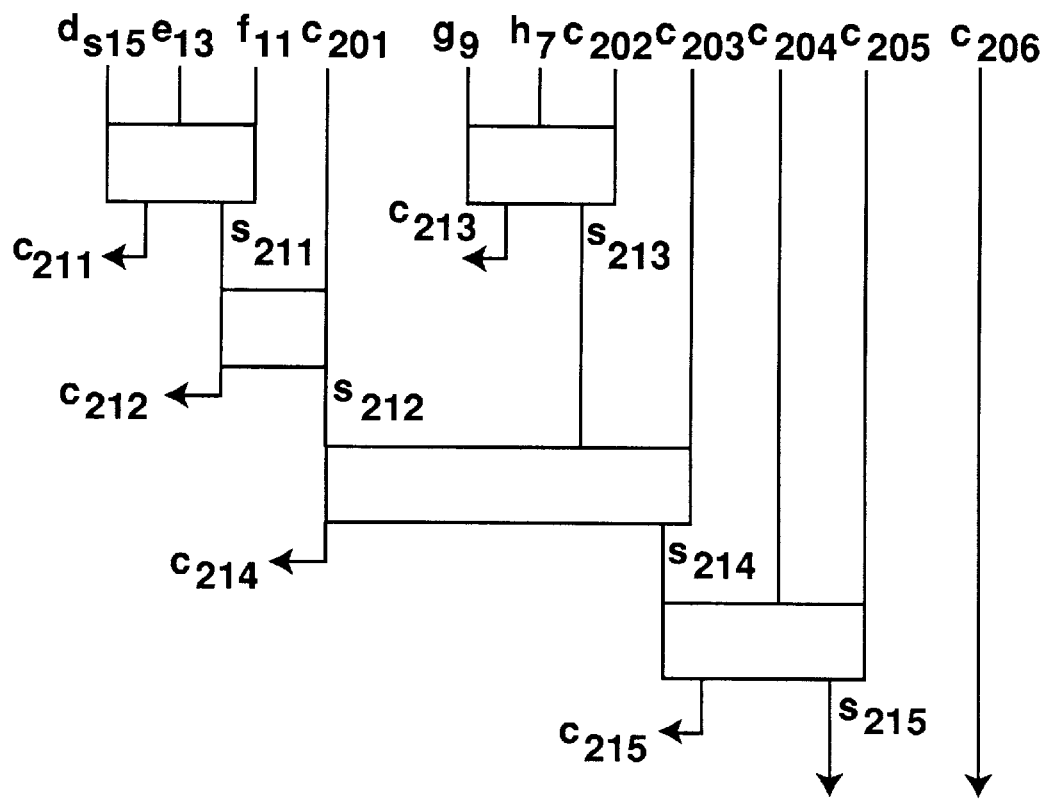
Figure 10W:
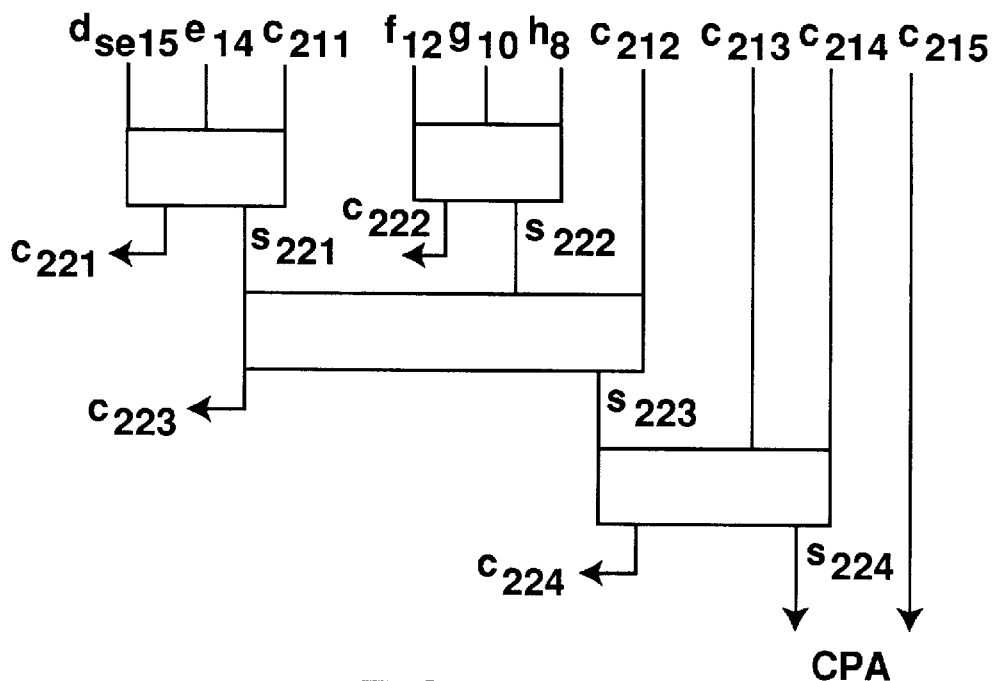
Figure 10X:
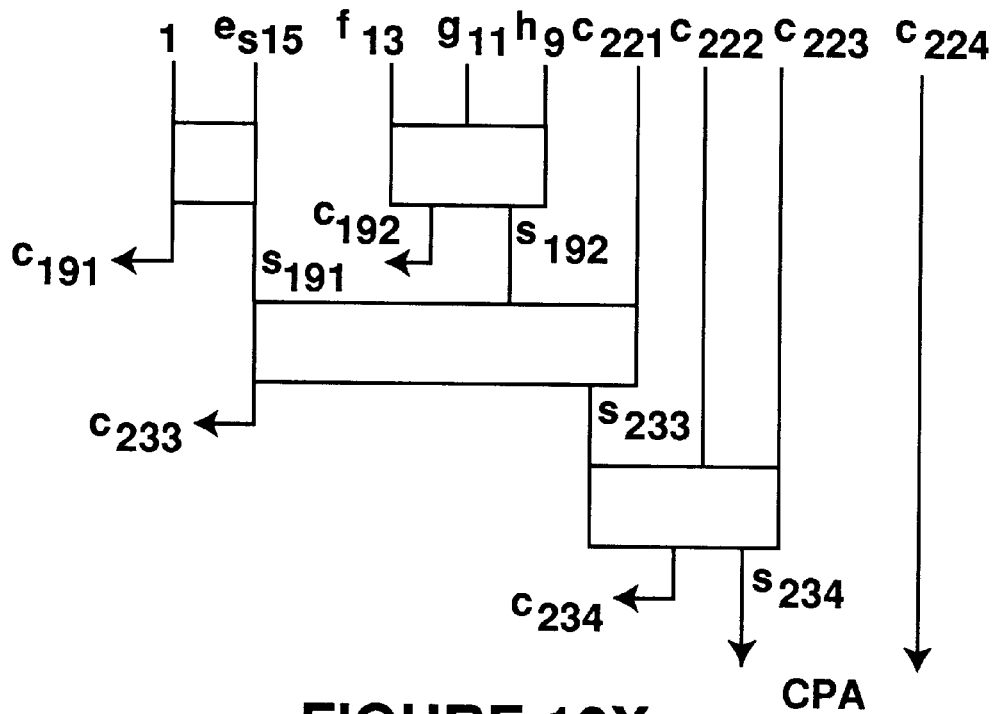
Figure 10Y:
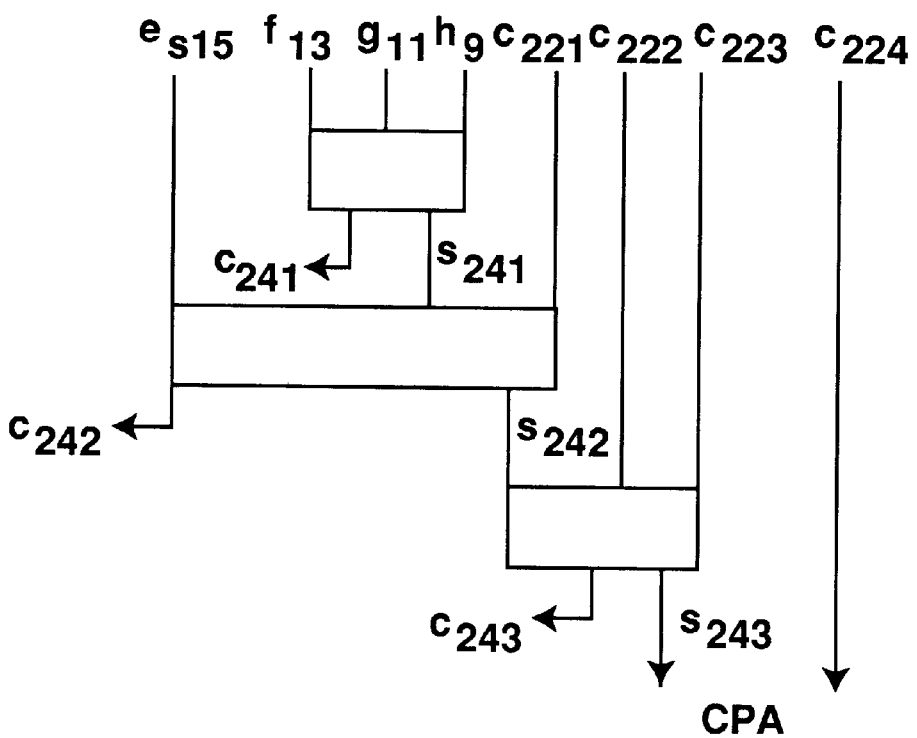
Figure 10Z:
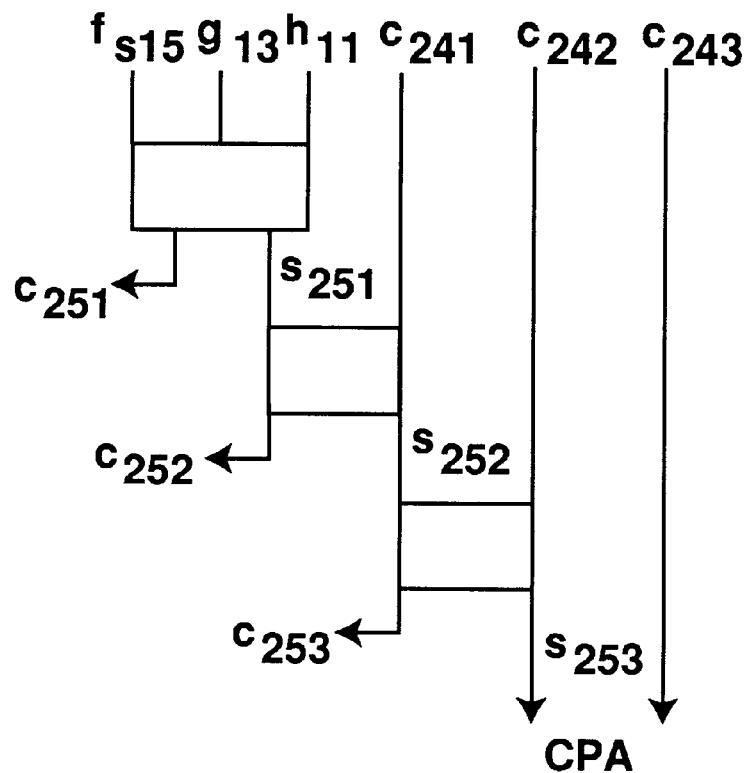
Figure 10A:
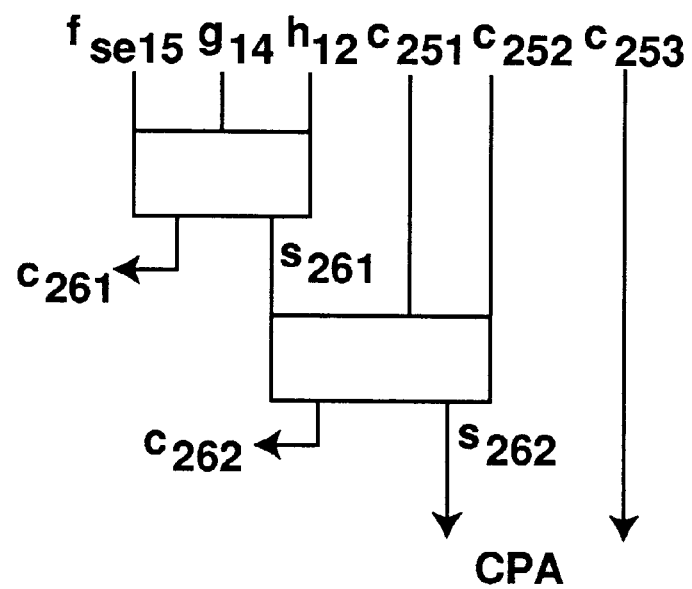
Figure 10A:
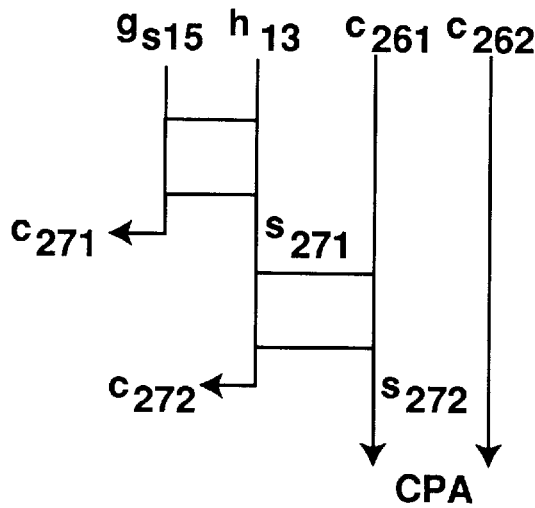
Figure 10A:
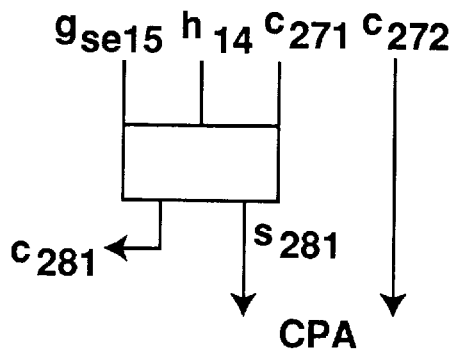
Figure 10A:
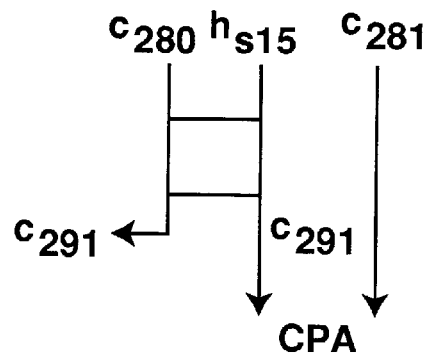
Figure 10A:
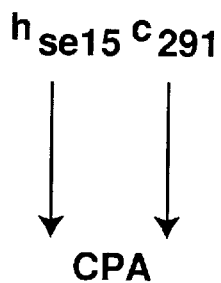
Figure 10A:
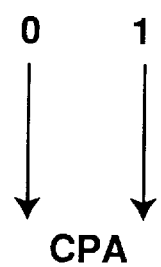

FIGS. 10a–10af illustrate one embodiment of a circuit, comprised of full adders and half adders, implementing the Wallace tree diagram illustrated in FIGS. 9a–9e. Each of FIGS. 10a–10af illustrate the logic of the multipliers to generate the respective bits for a particular bit position of the two final partial products shown in FIG. 9e. Thereafter, the two final partial products are joined by a Carry Propagate Adder (CPA).

Figure 11:
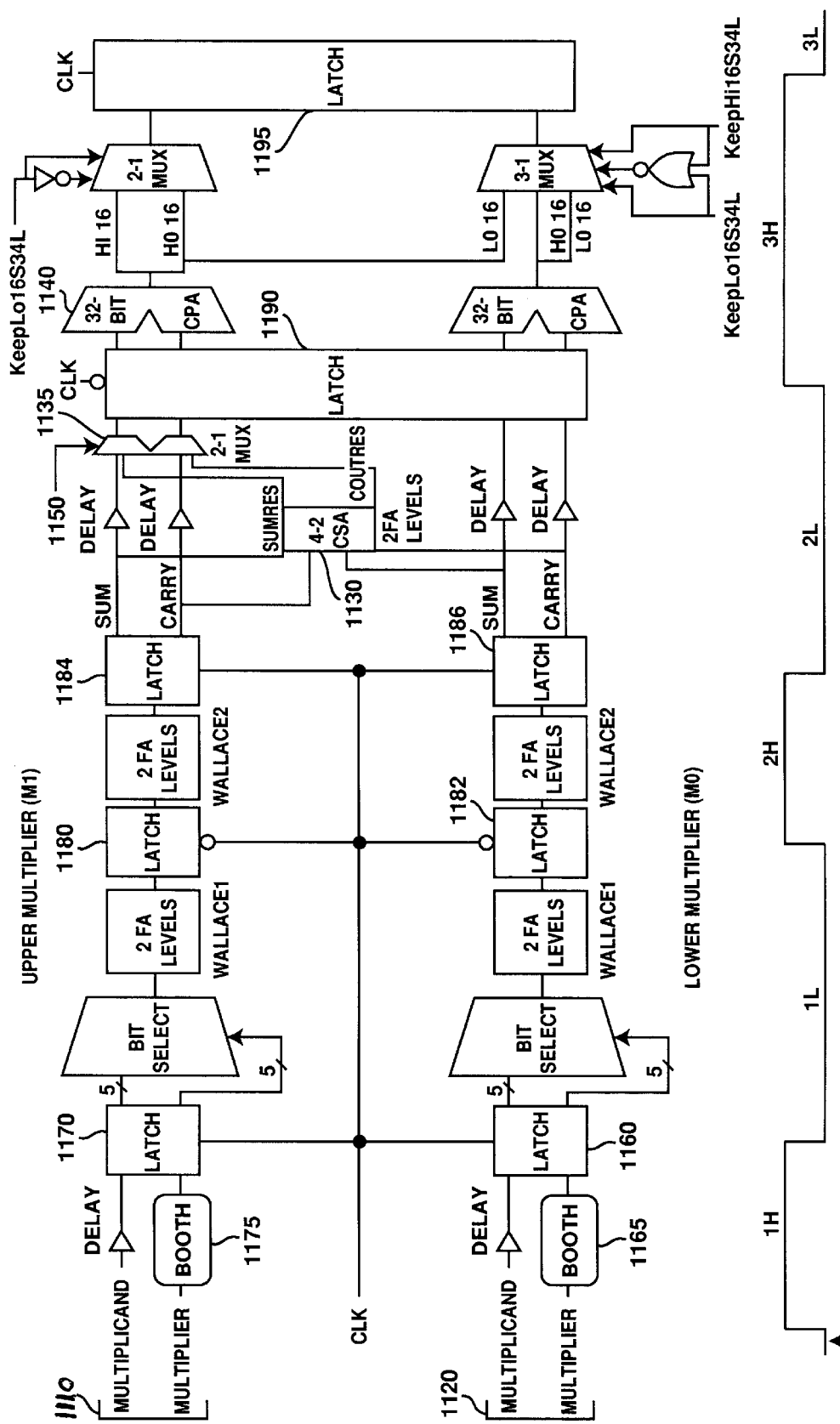
FIG. 11 illustrates a circuit for performing multiply-add operations on packed data according to one embodiment of the invention.

FIG. 11 illustrates one embodiment of a block diagram of the unit 145. There are 2 identical 16-bit multipliers illustrated. The multipliers could perform the multiply-add operation on either the 0–31 bit or the 32–63 bits. An additional 2 16-bit multipliers would also be provided, very similar in structure to the multipliers illustrated, to complete the multiply-add unit 145. As illustrated, each multiplier accomplishes a 16-bit multiplication resulting in 2 partial products in 1.5 clock cycles. In the next half clock cycle, which is the low phase of the 2nd clock, the 4 partial products generated by multipliers 1110 and 1120 are summed again by a 4:2 CSA 1130. The control signal 1150 selects either the partial product of the multiplier 1110 or the partial product generated at the output of the 4:2 CSA 1130 (Sumres and coutres). The selected data is latched along with the partial products of multiplier 1120. At the high phase of the 3rd clock, CPA 1140 generates a 32-bit result by adding the resultant partial products. The final partitioning of the 32-bit sum is accomplished by a mux-latch outside of the fub and the selected data is written back at the low phase of the 3rd clock cycle.

In one embodiment, the multiply-add unit 145 operates with a 3 latency-1 throughput rule. Otherwise stated, the unit 145 requires 3 clock cycles to complete its task every time an unpiped data stream is introduced to the inputs.

Even though the data is available at the inputs of unit 145 at the beginning of 0L, the data may not be valid until 1H begins. Therefore, the multiplication is assumed to start at the beginning of 1H. During 1H the valid and stable data on the multiplicand inputs flow through the delay elements and get latched by latches 1160 and 1170, respectively. At the same time, the data on the multiplier inputs propagate through the input buffers and the Booth encoders 1165 an 1175 and get latched by latches 1160 and 1170. At this point, the data on both multiplier and multiplicand paths are perfectly synchronized with each other. In 1L, the data goes through the bit selector array and a set of full adders, which forms the first part of the Wallace tree and becomes valid before the setup time for latches 1180 and 1182. The number of partial products at this point is reduced from 8 to 4. In 2H, the data goes through another set of full adders which constitute the remainder of the Wallace tree and become valid and stable at the end of 2H before getting latched by latches 1184 and 1186.

As previously explained, during 2L the data goes through 4:2 compressor 1130 (two full adders in series) and a 2-1 mux 1135 for the final partial product selection. The data becomes valid at the end of 2L before getting latched by latch 1190. During 3H, the two partial products at the latch 1190 output are finally reduced to one sum vector. This sum vector gets portioned and latched by a mux-latch boundary, latch 1195, outside of unit 145. In 3L, the data is available for write-back operation.

As previously described, the previous multiply accumulate instructions always add the results of their multiplications to an accumulation value. This accumulation value becomes a bottleneck for performing operations other than multiplying and accumulating (e.g., the accumulation value must be cleared each time a new set of operations is required which do not require the previous accumulation value). This accumulation value also becomes a bottleneck if operations, such as rounding, need to be performed before accumulation.

In contrast, the disclosed multiply-add operation does not carry forward an accumulation value. As a result, these instructions are easier to use in a wider variety of algorithms. In addition, software pipelining can be used to achieve comparable throughput. To illustrate the versatility of the multiply-add instruction, several example multimedia algorithms are described below. Some of these multimedia algorithms use additional packed data instructions. The operation of these additional packed data instructions are shown in relation to the described algorithms. For a further description of these packed data instructions, see "A Set of Instructions for Operating on Packed Data," filed on Aug. 31, 1995 Ser. No. 08/521,360, now abandoned. Of course, other packed data instructions could be used. In addition, a number of steps requiring the use of general purpose processor instructions to manage data movement, looping, and conditional branching have been omitted in the following examples.

1) Multiplication of Complex Numbers

The disclosed multiply-add instruction can be used to multiply two complex numbers in a single instruction as shown in Table 10a. As previously described, the multiplication of two complex number (e.g., $r_1$ $i_1$ and $r_2$ $i_2$) is performed according to the following equation:

$$\text{Real Component} = r_1 \cdot r_2 - i_1 \cdot i_2$$

$$\text{Imaginary Component} = r_1 \cdot i_2 + r_2 \cdot i_1$$

If this instruction is implemented to be completed every clock cycle, the invention can multiply two complex numbers every clock cycle.

TABLE 10a

| Multiply-Add Source1, Source2 | | | | |
|---|---|---|---|---|
| $r_1$ | $i_2$ | $r_1$ | $i_1$ | Source1 |
| $r_2$ | $-i_2$ | $i_2$ | $r_2$ | Source2 |
| = | | | | |
| Real Component: $r_1 r_2 - i_1 i_2$ | | Imaginary Component: $r_1 i_2 + r_2 i_1$ | | Result 1 |

As another example, Table 10b shows the instructions used to multiply together three complex numbers.

| Multiply-Add Source1, Source2 | | | | |
|---|---|---|---|---|
| $r_1$ | $i_1$ | $r_1$ | $i_1$ | Source1 |
| $r_2$ | $-i_2$ | $i_2$ | $r_2$ | Source2 |
| = | | | | |
| Real Component$_1$: $r_1 r_2 - i_1 i_2$ | | Imaginary Component$_1$: $r_1 i_2 + r_2 i_1$ | | Result1 |
| Packed Shift Right Source1, Source2 | | | | |
| Real Component$_1$ | | Imaginary Component$_1$ 16 | | Result1 |
| = | | | | |
| Real Component$_1$ | | Imaginary Component$_1$ | | Result2 |

TABLE 10b

| Pack Result2, Result2 | | | | |
|---|---|---|---|---|
| | Real Component$_1$ | | Imaginary Component$_1$ | Result2 |
| | Real Component$_1$ | | Imaginary Component$_1$ | Result2 |
| | = | | | |
| Real Component$_1$ | Imaginary Component$_1$ | Real Component$_1$ | Imaginary Component$_1$ | Result3 |
| Multiply-Add Result3, Source3 | | | | |
| Real Component$_1$: $r_1 r_2 - i_1 i_2$ $r_3$ | Imaginary Component$_1$: $r_1 r_2 + i_2 i_1$ $-i_3$ | Real Component$_1$: $r_1 r_2 - i_1 i_2$ $i_3$ | Imaginary Component$_1$: $r_1 i_2 + r_2 i_1$ $r_3$ | Result3 Source3 |
| = | | | | |
| Real Component$_2$ | | Imaginary Component$_2$ | | Result4 |

2) Multiply Accumulation Operations

The disclosed multiply-add instructions can also be used to multiply and accumulate values. For example, two sets of four data elements ($A_{1-4}$ and $B_{1-4}$) may be multiplied and accumulated as shown below in Table 11. In one embodiment, each of the instructions shown in Table 6 is implemented to complete each clock cycle.

TABLE 11

Multiply-Add Source1, Source2

| 0 | 0 | $A_1$ | $A_2$ | Source1 |
|---|---|---|---|---|
| 0 | 0 | $B_1$ | $B_2$ | Source2 |
| | | = | | |
| 0 | | $A_1B_1+A_2B_2$ | | Result1 |

Multiply-Add Source3, Source4

| 0 | 0 | $A_3$ | $A_4$ | Source3 |
|---|---|---|---|---|
| 0 | 0 | $B_3$ | $B_4$ | Source4 |
| | | = | | |
| 0 | | $A_3A_4+B_3B_4$ | | Result2 |

Unpacked Add Result1, Result2

| 0 | $A_1B_1+A_2B_2$ | Result1 |
|---|---|---|
| 0 | $A_3B_4+A_3B_4$ | Result2 |
| | = | |
| 0 | $A_1B_1+A_2B_2+A_3A_4+B_3B_4$ | Result3 |

If the number of data elements in each set exceeds 8 and is a multiple of 4, the multiplication and accumulation of these sets requires fewer instructions if performed as shown in Table 12 below.

TABLE 12

Multiply-Add Source1, Source2

| $A_1$ | $A_2$ | $A_3$ | $A_4$ | Source1 |
|---|---|---|---|---|
| $B_1$ | $B_2$ | $B_3$ | $B_4$ | Source2 |
| | = | | | |
| $A_1B_1+A_2B_2$ | | $A_3B_3+A_4B_4$ | | Result1 |

Multiply-Add Source3, Source4

| $A_5$ | $A_6$ | $A_7$ | $A_8$ | Source3 |
|---|---|---|---|---|
| $B_5$ | $B_6$ | $B_7$ | $B_8$ | Source4 |
| | = | | | |
| $A_5B_5+A_6B_6$ | | $A_7B_7+A_8B_8$ | | Result2 |

Packed Add Result1, Result2

| $A_1B_1+A_2B_2$ | $A_3B_3+A_4B_4$ | Result1 |
|---|---|---|
| $A_5B_5+A_6B_6$ | $A_7B_7+A_8B_8$ | Result2 |
| = | | |
| $A_1B_1+A_2B_2+A_5B_5+A_6B_6$ | $A_3B_3+A_4B_4+A_7B_7+A_8B_8$ | Result3 |

Unpack High Result3, Source5

| $A_1B_1+A_2B_2+A_5B_5+A_6B_6$ | $A_3B_3+A_4B_4+A_7B_7+A_8B_8$ | Result3 |
|---|---|---|
| 0 | 0 | Source5 |
| = | | |
| 0 | $A_1B_1+A_2B_2+A_5B_5+A_6B_6$ | Result4 |

Unpack Low Result3, Source5

| $A_1B_1+A_2B_2+A_5B_5+A_6B_6$ | $A_3B_3+A_4B_4+A_7B_7+A_8B_8$ | Result3 |
|---|---|---|
| 0 | 0 | Source5 |
| = | | |
| 0 | $A_3B_3+A_4B_4+A_7B_7+A_8B_8$ | Result4 |

Packed Add Result4, Result5

| 0 | $A_1B_1+A_2B_2+A_5B_5+A_6B_6$ | Result4 |
|---|---|---|
| 0 | $A_3B_3+A_4B_4+A_7B_7+A_8B_8$ | Result5 |
| | = | |
| 0 | TOTAL | Result6 |

As another example, Table 13 shows the separate multiplication and accumulation of sets A and B and sets C and D, where each of these sets includes 2 data elements.

TABLE 13

Multiply-Add Source1, Source2

| $A_1$ | $A_2$ | $C_1$ | $C_2$ | Source1 |
|---|---|---|---|---|
| $B_1$ | $B_2$ | $D_1$ | $D_2$ | Source2 |
| | = | | | |
| $A_1B_1+A_2B_2$ | | $C_1D_1+C_2D_2$ | | Result1 |

As another example, Table 14 shows the separate multiplication and accumulation of sets A and B and sets C and D, where each of these sets includes 4 data elements.

TABLE 14

Multiply-Add Source1, Source2

| $A_1$ | $A_2$ | $C_1$ | $C_2$ | Source1 |
|---|---|---|---|---|
| $B_1$ | $B_2$ | $D_1$ | $D_2$ | Source2 |
| | = | | | |
| $A_1B_1+A_2B_2$ | | $C_1D_1+C_2D_2$ | | Result1 |

Multiply-Add Source3, Source4

| $A_3$ | $A_4$ | $C_3$ | $D_4$ | Source3 |
|---|---|---|---|---|
| $B_3$ | $B_4$ | $D_3$ | $D_4$ | Source4 |
| | = | | | |
| $A_3B_3+A_4B_4$ | | $C_3D_3+C_4D_4$ | | Result2 |

Packed Add Result1, Result2

| $A_1B_1+A_2B_2$ | $C_1D_1+C_2D_2$ | Result1 |
|---|---|---|
| $A_3B_3+A_4B_4$ | $C_3D_3+C_4D_4$ | Result2 |
| | = | |
| $A_1B_1+A_2B_2+A_3B_3+A_4B_4$ | $C_1D_1+C_2D_2+C_3D_3+C_4D_4$ | Result6 |

3) Dot Product Algorithms

Dot product (also termed as inner product) is used in signal processing and matrix operations. For example, dot product is used when computing the product of matrices, digital filtering operations (such as FIR and IIR filtering), and computing correlation sequences. Since many speech compression algorithms (e.g., GSM, G.728, CELP, and VSELP) and Hi-Fi compression algorithms (e.g., MPEG and subband coding) make extensive use of digital filtering and correlation computations, increasing the performance of dot product increases the performance of these algorithms.

The dot product of two length N sequences A and B is defined as:

$$Result = \sum_{i=0}^{N-1} Ai \cdot Bi$$

Performing a dot product calculation makes extensive use of the multiply accumulate operation where corresponding elements of each of the sequences are multiplied together, and the results are accumulated to form the dot product result.

The dot product calculation can be performed using the multiply-add instruction. For example if the packed data type containing four sixteen-bit elements is used, the dot product calculation may be performed on two sequences each containing four values by:

1) accessing the four sixteen-bit values from the A sequence to generate Source1 using a move instruction;

2) accessing four sixteen-bit values from the B sequence to generate Source2 using a move instruction; and 3) performing multiplying and accumulating as previously described using a multiply-add, packed add, and shift instructions.

For vectors with more than just a few elements the method shown in Table 9 is used and the final results are added together at the end. Other supporting instructions include the packed OR and XOR instructions for initializing the accumulator register, the packed shift instruction for shifting off unwanted values at the final stage of computation. Loop control operations are accomplished using instructions already existing in the instruction set of processor 109.

4) Discrete Cosine Transform Algorithms

Discrete Cosine Transform (DCT) is a well known function used in many signal processing algorithms. Video and image compression algorithms, in particular, make extensive use of this transform.

In image and video compression algorithms, DCT is used to transform a block of pixels from the spatial representation to the frequency representation. In the frequency representation, the picture information is divided into frequency components, some of which are more important than others. The compression algorithm selectively quantifies or discards the frequency components that do not adversely affect the reconstructed picture contents. In this manner, compression is achieved.

There are many implementations of the DCT, the most popular being some kind of fast transform method modeled based on the Fast Fourier Transform (FFT) computation flow. In the fast transform, an order N transform is broken down to a combination of order N/2 transforms and the result recombined. This decomposition can be carried out until the smallest order 2 transform is reached. This elementary 2 transform kernel is often referred to as the butterfly operation. The butterfly operation is expressed as follows:

$$X = a^* x + b^* y$$

$$Y = c^* x - d^* y$$

where a, b, c and d are termed the coefficients, x and y are the input data, and X and Y are the transform output.

The multiply-add allows the DCT calculation to be performed using packed data in the following manner:

1) accessing the two 16-bit values representing x and y to generate Source1 (see Table 10 below) using the move and unpack instructions;
2) generating Source2 as shown in Table 10 below—Note that Source2 may be reused over a number of butterfly operations; and
3) performing a multiply-add instruction using Source1 and Source2 to generate the Result (see Table 15 below).

TABLE 15

| x | y | x | y | Source 1 |

| a | b | c | -d | Source 2 |

| a·x + b·y | c·x - d·y | Source 3 |

In some situations, the coefficients of the butterfly operation are 1. For these cases, the butterfly operation degenerates into just adds and subtracts that may be performed using the packed add and packed subtract instructions.

An IEEE document specifies the accuracy with which inverse DCT should be performed for video conferencing. (See, IEEE Circuits and Systems Society, "IEEE Standard Specifications for the Implementations of 8×8 Inverse Discrete Cosine Transform," IEEE Std. 1180–1990, IEEE Inc. 345 East 47th St., NY, N.Y. 10017, USA, Mar. 18, 1991). The required accuracy is met by the disclosed multiply-add instruction because it uses 16-bit inputs to generate 32-bit outputs.

In this manner, the described multiply-add instruction can be used to improve the performance of a number of different algorithms, including algorithms that require the multiplication of complex numbers, algorithms that require transforms, and algorithms that require multiply accumulate operations. As a result, this multiply-add instruction can be used in a general purpose processor to improve the performance of a greater number algorithms than the described previous instructions.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A processor comprising:
   a first and second storage areas to have a first and second packed data, respectively, each packed data having a first, second, third, and fourth data element;
   a multiply-add circuit coupled to said first and second storage areas, said multiply-add circuit having a first, second, third, and fourth multiplier, each said multiplier to receive a corresponding set of said data elements;
   said multiply-add circuit including a first Carry Save Adder (CSA) coupled to said first and second multipliers, said first CSA to receive two partial products generated by said first multiplier and receive two partial products generated by said second multiplier, said first CSA to generate a first set of two partial products, and a second CSA coupled to said third and fourth multipliers, said second CSA to receive two partial products generated by said third multiplier and receive two partial products generated by said fourth multiplier, said second CSA to generate a second set of two partial products
   said multiply-add circuit further including a first adder coupled to said first CSA, and a second adder coupled to said second CSA; and
   a third storage area coupled to said adders, said third storage area having a first and second field for saving outputs of said first and second adders, respectively, as first and second unaccumulated data elements of a third packed data.

2. The processor of claim 1, wherein each multiplier performs at least a 16-bit multiplication resulting in two partial products.

3. The processor of claim 2, wherein said multipliers each includes a means for selecting eight partial products and each said multiplier includes four levels of CSA's.

4. The processor of claim 3, wherein each of said four levels of CSA's included in each multiplier include a first level reducing said eight partial products to six partial products, a second level reducing said six partial products to four partial products, a third level reducing four partial products to three partial products, and a fourth level reducing said three partial products to two partial products.

5. The processor of claim 4, wherein said first adder is coupled to said first CSA and said first adder generates a summation of said two partial products generated by said first CSA; and said second adder is coupled to said second CSA and said second adder generates a summation of said two partial products generated by said second CSA.

6. The processor of claim 2, wherein each said multiplier implements a 2-bit Booth encoding to select a set of eight partial products.

7. The processor of claim 6, wherein each said multiplier implements a sign generate method to replace sign extending of said partial products.

8. The processor of claim 7, wherein each said multiplier relocates an extra bit generated by the sign generation method to a corresponding vacant bit position in a separate partial product row.

9. A processor comprising:
   a first storage area operable to have stored therein a first packed data containing at least an A1, an A2, an A3, and an A4 element;
   a second storage area operable to have stored therein a second packed data containing at least a B1, a B2, a B3, and a B4 element;
   a multiply circuit including
      a first multiplier coupled to said first storage area to receive said A1 and coupled to said second storage area to receive said B1;
      a second multiplier coupled to said first storage area to receive said A2 and coupled to said second storage are to receive said B2;
      a third multiplier coupled to said first storage area to receive said A3 and coupled to said second storage area to receive said B3;
      a fourth multiplier coupled to said first storage area to receive said A4 and coupled to said second storage area to receive said B4;
   said multiply-add circuit including a first Carry Save Adder (CSA) coupled to said first and second multipliers, said first CSA to receive two partial products generated by said first multiplier and receive two partial products generated by second multiplier, said first CSA to generate a first set of two partial products, and a second (CSA) coupled to said third and fourth multipliers, said second CSA to receive two partial products generated by said third multiplier and receive two partial products generated by said fourth multiplier, said second CSA to generate a second set of two partial products
      a first adder coupled to said first CSA and said second CSA;
      a second adder coupled to said third multiplier and said fourth multiplier; and
   a third storage area coupled to said first adder and said second adder, said third storage area having at least a first field and a second field, said first field for saving an unaccumulated output of said first adder as a first unaccumulated data element of a third packed data, said second field for saving an unaccumulated output of said second adder as a second unaccumulated data element of said third packed data.

10. The processor of claim 9, wherein each multiplier performs at least a 16-bit multiplication resulting in 2 partial products.

11. The processor of claim 10, wherein said multipliers each includes a means for selecting eight partial products and each said multiplier includes four levels of CSA's.

12. The processor of claim 11, wherein each of said four levels of CSA's included in each multiplier include a first level reducing said eight partial products to six partial products, a second level reducing said six partial products to four partial products, a third level reducing four partial products to three partial products, and a fourth level reducing said three partial products to two partial products.

13. The processor of claim 12, wherein said first adder is coupled to said first CSA and said first adder generates a summation of said two partial products generated by said first CSA; and
   said second adder is coupled to said second CSA and said second adder generates a summation of said two partial products generated by said second CSA.

14. The processor of claim 10, wherein each said multiplier implementing a 2-bit Booth encoding to select a set of eight partial products.

15. The processor of claim 14, wherein each said multiplier implements a sign generate method to replace sign extending of said partial products.

16. The processor of claim 15, wherein each said multiplier relocates an extra bit generated by the sign generation method to a corresponding vacant bit position in a separate partial product row.

* * * * *

UNITED STATES PATENT AND TRADEMARK OFFICE
CERTIFICATE OF CORRECTION

PATENT NO. : 6,035,316
DATED : March 7, 2000
INVENTOR(S) : Peleg et al.

It is certified that error appears in the above-identified patent and that said Letters Patent is hereby corrected as shown below:

In column 17, at line 27, after "partial" insert --products--.

In column 19, at line 63, after "16" insert --in--.

In column 22, at line 57, delete "$r_1 r_2 + i_2 i_1$" and insert --$r_1 i_2 + r_2 i_1$--.

In column 24, at line 23, delete "$D_4$" and insert --$C_4$--.

In column 25, at line 18, delete "arc" and insert --are--.

In column 26, at line 37, delete "CSA" and insert --(CSA)--.

Signed and Sealed this

Twenty-second Day of May, 2001

*Attest:*

NICHOLAS P. GODICI

*Attesting Officer*  *Acting Director of the United States Patent and Trademark Office*